US009306799B2

(12) United States Patent
Hyo

(10) Patent No.: US 9,306,799 B2
(45) Date of Patent: Apr. 5, 2016

(54) INFORMATION PROCESSING APPARATUS, INFORMATION PROCESSING METHOD, AND COMPUTER PROGRAM PRODUCT

(71) Applicant: Kiyohiro Hyo, Tokyo (JP)

(72) Inventor: Kiyohiro Hyo, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 273 days.

(21) Appl. No.: 13/846,031

(22) Filed: Mar. 18, 2013

(65) Prior Publication Data

US 2013/0246657 A1 Sep. 19, 2013

(30) Foreign Application Priority Data

Mar. 19, 2012 (JP) ................................ 2012-062845
Nov. 14, 2012 (JP) ................................ 2012-250680

(51) Int. Cl.
*G06F 15/16* (2006.01)
*H04L 29/08* (2006.01)

(52) U.S. Cl.
CPC ...... *H04L 29/08756* (2013.01); *H04L 67/2823* (2013.01)

(58) Field of Classification Search
CPC ..... H04L 12/24; H04L 41/00; H04L 41/0253; H04L 41/22; H04L 63/0428; H04L 63/10; H04L 63/18; H04L 67/025; H04L 69/14; H04L 63/08; Y02B 60/33
USPC .................................. 709/223, 224, 246, 247
See application file for complete search history.

(56) References Cited

U.S. PATENT DOCUMENTS

| 7,475,150 | B2* | 1/2009 | Grabarnik et al. ............ 709/228 |
| 8,484,325 | B1* | 7/2013 | Maity ............................ 709/223 |
| 2002/0073356 | A1 | 6/2002 | Katayama et al. |
| 2002/0091821 | A1 | 7/2002 | Katayama et al. |
| 2006/0031447 | A1* | 2/2006 | Holt et al. ...................... 709/223 |
| 2006/0107088 | A1 | 5/2006 | Katayama et al. |
| 2008/0148398 | A1* | 6/2008 | Mezack et al. .................. 726/22 |
| 2008/0225816 | A1 | 9/2008 | Osterling et al. |
| 2009/0063612 | A1 | 3/2009 | Hyo |

(Continued)

FOREIGN PATENT DOCUMENTS

CN 101002416 A 7/2007
CN 101782886 A 7/2010

(Continued)

OTHER PUBLICATIONS

U.S. Appl. No. 13/667,777, filed Nov. 2, 2012, Kiyohiro Hyo.

(Continued)

*Primary Examiner* — Cheikh Ndiaye
(74) *Attorney, Agent, or Firm* — Oblon, McClelland, Maier & Neustadt, L.L.P.

(57) ABSTRACT

An information processing apparatus is connectable to a plurality of devices of different types via a network. The information processing apparatus includes a receiving unit that receives, from the devices, management information of each of the devices in a data format corresponding to the respective devices; a first storage unit that stores therein a first conversion rule for converting the management information into manage information in a first common data format common to the devices; and a conversion unit that converts the management information thus received into management information in the first common data format based on the first conversion rule.

10 Claims, 17 Drawing Sheets

(56) References Cited

U.S. PATENT DOCUMENTS

| | | |
|---|---|---|
| 2010/0002254 A1 | 1/2010 | Hyo |
| 2010/0220352 A1 | 9/2010 | Hyo |
| 2011/0067088 A1 | 3/2011 | Hyo |
| 2012/0239830 A1* | 9/2012 | Sugimura et al. ............... 710/29 |

FOREIGN PATENT DOCUMENTS

| | | |
|---|---|---|
| CN | 102298369 A | 12/2011 |
| JP | 2002-157171 | 5/2002 |
| JP | 2004-171277 | 6/2004 |
| JP | 2005-102060 | 4/2005 |
| JP | 4185661 | 9/2008 |
| JP | 2010-206569 | 9/2010 |
| JP | 2012-213144 | 11/2012 |

OTHER PUBLICATIONS

Office Action mailed Nov. 10, 2015 in Chinese Patent Application No. 201310087467.X (with English Translation).

* cited by examiner

FIG.3

| INFORMATION ID | ITEM NAME | DATA TYPE | UNIT | MAXIMUM VALUE | MINIMUM VALUE |
|---|---|---|---|---|---|
| 11000000001 | DEVICE ID | CHARACTER STRING | - | - | - |
| 11000000002 | PRODUCT NAME | CHARACTER STRING | - | - | - |
| 11000000003 | MODEL CODE | CHARACTER STRING | - | - | - |
| 11000000004 | FIRMWARE VERSION | CHARACTER STRING | - | - | - |
| 11001000005 | TIME OF USE | CHARACTER STRING | - | - | - |
| 11001000006 | POWER CONSUMPTION | NUMERICAL VALUE | KW | 999999.99 | 000000.00 |
| 11001000007 | $CO_2$ REDUCTION | NUMERICAL VALUE | g | 9999.99 | 0000.00 |

FIG.4

| MODEL CODE | MANAGEMENT INFORMATION ID |
|---|---|
| KAZ- | A |
| LBY- | B |
| LOV | C |
| MINA | D |

FIG.5

| INFORMATION ID | VALUE |
|---|---|
| 11000000001 | KAZ-000373 |
| 11000000002 | IPSIO-PJ1 |
| 11000000003 | KAZ- |
| 11000000004 | 20110930_001 |
| 11001000005 | 0001H-32M-45S |
| 11001000006 | 333.33 |
| 11001000007 | 0.97 |

FIG.6

| FIRST CONVERSION RULE | | |
|---|---|---|
| INFORMATION ID | COMMON DATA FORMAT | COMMON UNIT |

FIG.10

| COMMAND ID | ITEM NAME | DATA TYPE |
|---|---|---|
| 11002000010 | USE OF PROXY SERVER | CHARACTER STRING |
| 11002000011 | PROXY SERVER NAME | CHARACTER STRING |
| 11002000012 | PROXY PASSWORD | CHARACTER STRING |

FIG.11

| PROCESSING | COMMAND ID | COMMAND |
|---|---|---|
|  |  |  |
|  |  |  |
|  |  |  |

FIG.12

| COMMAND ID | PARAMETER |
|---|---|
| 11002000010 | ON |
| 11002000011 | example.jp |
| 11002000012 | hogehoge |

FIG.15A

[INFO],[2012-10-01 17:59:41.057157],GET,/sample/data/1,SUCCESS,3098.832,

FIG.15B

[INFO] [2012/10/01 11:24:54.464322]{"status":200,"method":"GET","path":"/sample/data/1","response_at":"2012-10-01T01:23:45Z","total_runtime":4.075}

FIG.15C

[2012/10/01 11:24:54.464322],method=GET,URI=/sample/data/1,total=3.999

FIG.16A

| DEVICE ID | LOG DEFINITION |

FIG.16B (Level, DEFINITION),(Timestamp, UTC),(Method, HTTP method),
(Location, URI DESCRIPTION),(Result, DEFINITION),(ResponseTime, MICROSECONDS),

FIG.16C

Level Time
{"status":"http status code","method":"DEFINITION","path":"URI DESCRIPTION
","response_at":"UTC","total_runtime":"msec"}

FIG.16D (time,UTC),(method, HTTP method),(URI, URI DESCRIPTION),(total, msec)

FIG.17

```
level= (MFP1, Level), (PROJECTOR 1, Level), (TV CONFERENCE TERMINAL 1, NONE)
time= (MFP1, Timestamp), (PROJECTOR 1, Time), (TV CONFERENCE TERMINAL 1, time)
method= (MFP1, Method), (PROJECTOR 1, method), (TV CONFERENCE TERMINAL 1, method)
URI= (MFP1, Location), (PROJECTOR 1, path), (TV CONFERENCE TERMINAL 1, URI)
totalTime= (MFP1, ResponseTime), (PROJECTOR 1, total_runtime), (TV CONFERENCE TERMINAL 1, total)
```

FIG.18A

```
DeviceId=1A-11111
Level=INFO
Timestamp=2012-10-01 17:59:41.057157
Method=GET
Location=/sample/data/1
Result=SUCCESS
ResponseTime=3098.832
```

FIG.18B

```
DeviceId=2B-22222
Level=INFO
Time=2012/10/01 11:24:54.464322
status=200
method=GET
path=/sample/data/1
response_at=2012-10-01T01:23:45Z
total_runtime=4.075
```

FIG.18C

```
DeviceId=3C-33333
time=2012/10/01 11:24:54.464322
method=GET
URI=/sample/data/1
total=3.999
```

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-062845 filed in Japan on Mar. 19, 2012 and Japanese Patent Application No. 2012-250680 filed in Japan on Nov. 14, 2012.

BACKGROUND OF THE INVENTION

1. Field of the Invention

The present invention relates to an information processing apparatus, an information processing method, and a computer program product.

2. Description of the Related Art

Conventionally widely known are systems that remotely control various devices and systems that remotely manage various devices. Japanese Patent No. 4185661, for example, discloses a method for readily setting and managing identification information of each device by using a home gateway to control various types of devices. Japanese Patent Application Laid-open No. 2004-171277 discloses a method for managing a personal computer together with various devices by using a device monitoring (managing) server.

In the conventional technology, however, if a new type of device is added as a device to be managed, it may possibly be difficult to support the device because of difference in a data format to be dealt with, for example.

Therefore, there is a need for an information processing apparatus and an information processing method that, even if a new type of device is added as a device to be managed, can readily support the device.

SUMMARY OF THE INVENTION

According to an embodiment, there is provided an information processing apparatus connectable to a plurality of devices of different types via a network. The information processing apparatus includes a receiving unit that receives, from the devices, management information of each of the devices in a data format corresponding to the respective devices; a first storage unit that stores therein a first conversion rule for converting the management information into manage information in a first common data format common to the devices; and a conversion unit that converts the management information thus received into management information in the first common data format based on the first conversion rule.

According to another embodiment, there is provided an information processing method performed in an information processing apparatus connectable to a plurality of devices of different types via a network. The information processing method includes receiving, from the devices, management information of each of the devices in a data format corresponding to the respective devices; and converting, based on a first conversion rule for converting the management information into manage information in a first common data format common to the devices, the management information thus received into management information in the first common data format.

According to still another embodiment, there is provided a computer program product including a non-transitory computer-readable medium having a computer-readable program. The program causes a computer, which is connectable to a plurality of devices of different types via a network, to execute receiving, from the devices, management information of each of the devices in a data format corresponding to the respective devices; and converting, based on a first conversion rule for converting the management information into manage information in a first common data format common to the devices, the management information thus received into management information in the first common data format.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a view for explaining an example of a management information MDB according to the first embodiment;

FIG. 4 is a view for explaining an example of a model code DB according to the first embodiment;

FIG. 5 is a view for explaining an example of management information in a data format of each device acquired from each device according to the first embodiment;

FIG. 6 is a view for explaining an example of a first conversion rule according to the first embodiment;

FIG. 10 is a view for explaining an example of a command management MDB according to the second embodiment;

FIG. 11 is a view for explaining an example of a command DB according to the second embodiment;

FIG. 12 is a view for explaining an example of processing performance information according to the second embodiment;

FIG. 15A is a view for explaining an example of processing history information in a data format of an MFP;

FIG. 15B is a view for explaining an example of the processing history information in a data format of a projector;

FIG. 15C is a view for explaining an example of the processing history information in a data format of a television (TV) conference terminal;

FIG. 16A is a view for explaining a log definition DB;

FIG. 16B is a view for explaining the log definition of the MFP;

FIG. 16C is a view for explaining the log definition of the projector;

FIG. 16D is a view for explaining the log definition of the TV conference terminal;

FIG. 17 is a view for explaining a second conversion rule;

FIG. 18A is view for explaining a converted DB corresponding to the device ID "MFP 1";

FIG. 18B is a view for explaining an example of the converted DB corresponding to the device ID "projector 1";

FIG. 18C is a view for explaining an example of the converted DB corresponding to the device ID "TV conference terminal 1";

DETAILED DESCRIPTION OF THE PREFERRED EMBODIMENTS

Exemplary embodiments are described below in detail with reference to the accompanying drawings.

First Embodiment

Figure 1:
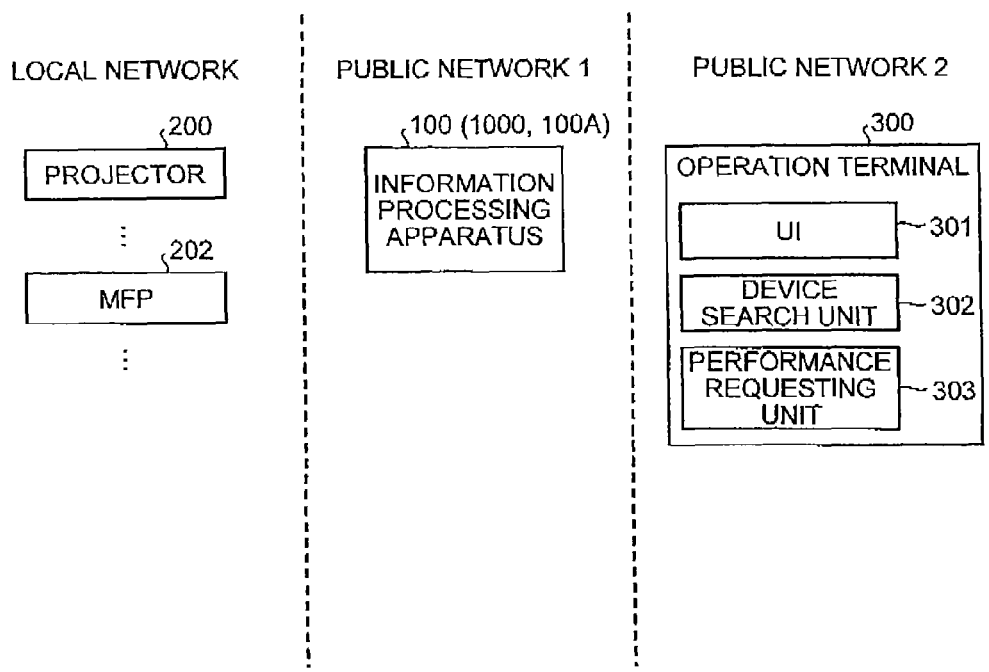
FIG. 1 is a schematic of a network configuration of an information processing system according to a first embodiment.

FIG. 1 is a schematic of a network configuration of an information processing system according to a first embodiment of the present invention. As illustrated in FIG. 1, the information processing system according to the present embodiment includes an information processing apparatus 100, an operation terminal 300, and a plurality of different types of devices such as a projector 200 and a multifunction peripheral (MFP) 202. While the projector 200 and the MFP 202 are illustrated as the different types of devices in FIG. 1, the information processing system may further include one or a plurality of different types of devices.

The different types of devices are devices equipped with different functions. A function is a type of processing that can be performed by each device. Examples of the function include a function to transmit information of an image to be output and a function to input various types of information, such as printing, projection, and display. The function is not limited to an input and output function of data. A function to change various types of setting information, such as setting of a network, is also included in the function, for example.

As illustrated in FIG. 1, the devices such as the projector 200 and the MFP 202 are present in a local network. The information processing apparatus 100 is present in a public network 1. The operation terminal 300 is present in a public network 2.

The multiple types of devices, such as the projector 200 and the MFP 202, and the information processing apparatus 100 can be connected via a network. The multiple types of devices, such as the projector 200 and the MFP 202, and the operation terminal 300 can be connected via a communication line, such as a network. The information processing apparatus 100, the operation terminal 300, and the multiple types of devices, such as the projector 200 and the MFP 202, can be connected via a network. Examples of the network include the Internet and a local area network (LAN).

The MFP 202 is an image forming apparatus equipped with at least two functions of a copying function, a printing function, a scanning function, and a facsimile function. The projector 200 is an apparatus having an image display function to project a still image and a moving image onto a projection plane, such as a screen and a wall, as video.

While the MFP 202 and the projector 200 are explained as examples of the multiple types of devices in the present embodiment, the multiple types of devices are not limited thereto. The multiple types of devices may include an image forming apparatus other than an MFP, such as a copier, a scanner, a printer, and a facsimile, and other information output devices (e.g., a personal computer, a mobile terminal such as a smartphone, and a video conferencing system), for example.

The operation terminal 300 receives a device ID (identification information) for uniquely identifying a device to be a target of a processing request made by a user as well as an acquisition request for management information of the device identified by the device ID, and transmits the device ID and the acquisition request for management information to the information processing apparatus 100. While a personal computer (PC) or a mobile terminal are used as the operation terminal 300, for example, the operation terminal 300 is not limited thereto. The operation terminal 300 transmits various types of information, such as the device ID and the acquisition request for management information, in a data format unique to the operation terminal 300.

The operation terminal 300 includes a UI 301, a device search unit 302, and a performance requesting unit 303.

The user interface 301 (hereinafter, referred to as the "UI 301") displays various screens to the user and receives various operations from the user. In the present embodiment, the UI 301 displays an input screen that receives a device ID (identification information) of a device to be a target of a processing request made by the user and an acquisition request for management information of the device identified by the device ID to the user and receives the device ID and the acquisition request for management information with an operation performed by the user.

The device search unit 302 searches for a device such as the projector 200 and the MFP 202 in the network and establishes an ad-hoc network connection with the device thus searched for. Furthermore, the device search unit 302 requests the device with which the ad-hoc network connection is established to transmit a device ID, which is identification information for identifying a device, and receives the device ID.

The performance requesting unit 303 transmits an acquisition request in which a device ID is specified (that is, a device ID and an acquisition request for management information) to the information processing apparatus 100.

When the devices such as the projector 200 and the MFP 202 receive a request for a device ID from the operation terminal 300, the devices transmit their own device IDs to the operation terminal 300.

The information processing apparatus 100 manages various devices connectable to the network of the information processing system. In the present embodiment, the information processing apparatus 100 receives a device ID and an acquisition request for management information from the operation terminal 300 in the data format of the operation terminal 300. The information processing apparatus 100 then transmits management information of the device identified by the device ID to the operation terminal 300 in a first common data format common to the devices. Detailed description will be given later.

While examples of the information processing apparatus 100 include a computer such as a server, a work station, and a PC, an image forming apparatus such as an MFP and a copier, an information projection apparatus such as a projector, and a mobile terminal such as a mobile phone, a personal data assistance (PDA), and a tablet terminal, the information processing apparatus 100 is not limited thereto.

The projector 200 and the MFP 202 serving as the different types of devices each perform functions such as an input function and an output function. Furthermore, the projector 200 and the MFP 202 receive a request from the information processing apparatus 100 and transmit management information to the information processing apparatus 100.

The management information includes identification information of each device and an actual value corresponding to a processing item that changes depending on usage of each device, for example, and varies depending on the type and the usage of each device. The management information will be described later in detail.

In the present embodiment, both the projector 200 and the MFP 202 can be an input device and an output device.

Figure 2:
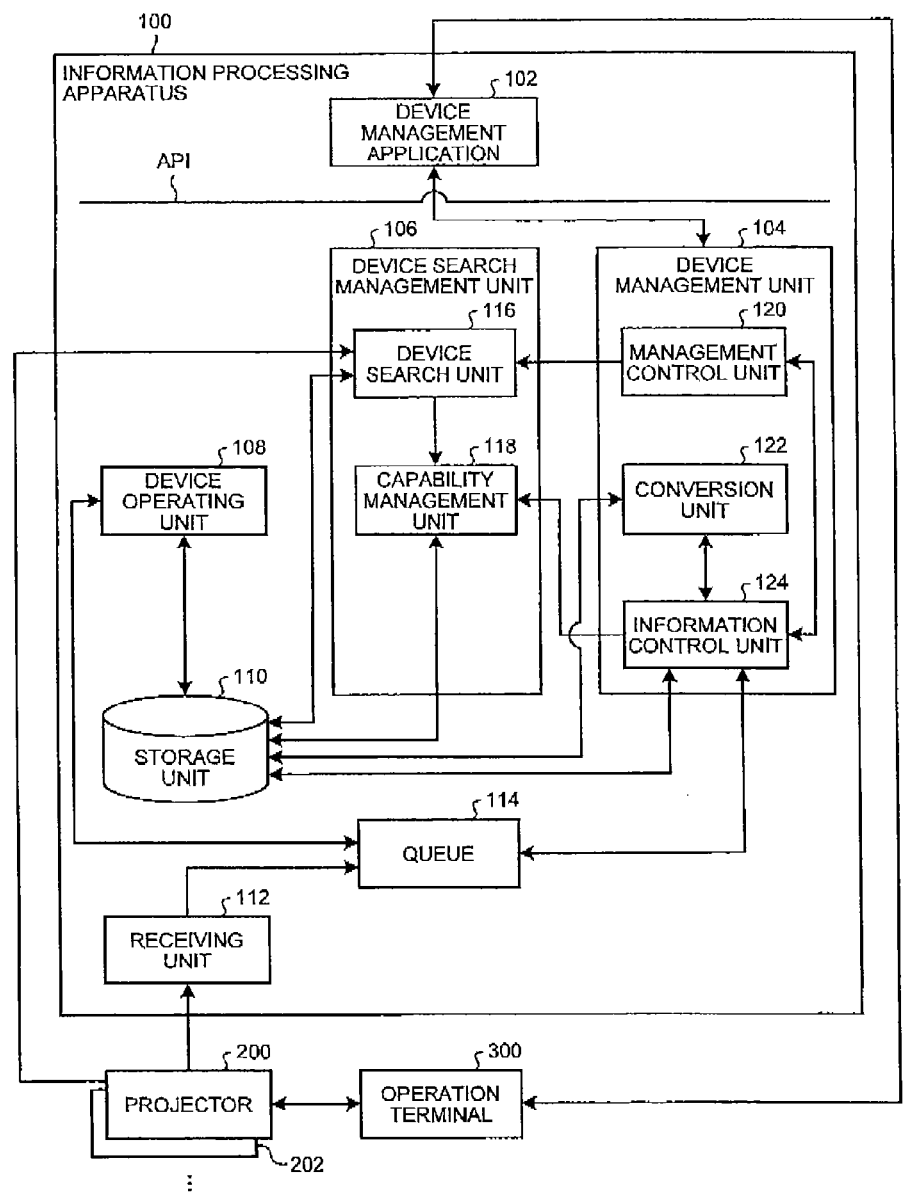
FIG. 2 is a block diagram of a functional configuration of an information processing apparatus according to the first embodiment.

FIG. 2 is a block diagram of a functional configuration of the information processing apparatus 100.

As illustrated in FIG. 2, the information processing apparatus 100 includes a device management application 102 (a request receiving unit), a device management unit 104, a device search management unit 106, a device operating unit 108, a storage unit 110 (a first storage unit), a receiving unit 112, and a queue 114.

The information processing apparatus 100 is divided into an upper layer and a lower layer by a boundary of an application programming interface (hereinafter, referred to as an "API"). The information processing apparatus 100 has the device management application 102 in the upper layer. Furthermore, the information processing apparatus 100 has the device management unit 104, the device search management unit 106, the device operating unit 108, the storage unit 110, the receiving unit 112, and the queue 114 in the lower layer below the boundary of API.

The device management application 102 receives, from the operation terminal 300, an acquisition request in which a device ID is specified. In the present embodiment, as described above, the acquisition request includes a device ID (identification information) for uniquely identifying a device to be a target of a processing request made by the user and an acquisition request for management information of the device identified by the device ID.

The device management application 102 uses the API to transmit the acquisition request in which the device ID is specified and which is received from the operation terminal 300 to the device management unit 104 as a processing request corresponding to the acquisition request. Furthermore, the device management application 102 receives management information, which corresponds to the device identified by the device ID specified in the processing request and which is converted into the first common data format common to a plurality of devices, as well as receives the device ID specified in the processing request from the device management unit 104. The device management application 102 then transmits the management information in the first common data format thus received to the device identified by the device ID thus received.

The API can receive various requests, such as an acquisition request, from the device management application 102 using a predefined function, such as parameter specification. If the API receives an acquisition request by using the function, the API issues a processing request for acquisition of management information of the device identified by the device ID specified in the acquisition request to the device management unit 104. Thus, the device management application 102 issues the processing request corresponding to the acquisition request received from the operation terminal 300 to the device management unit 104 via the API.

In other words, the API and the layer lower than the API have a function to serve as a platform of processing for the device management application 102.

The API will now be described in detail. In the present embodiment, an acquisition request function is provided as the API.

1) Acquisition Request
<Input parameter>
Device ID
Parameter (including an acquisition request for management information)
<Response>
Device ID
Parameter (management information in the first common data format)

Therefore, by calling the acquisition request function that specifies the input parameter, the device management application 102 issues a processing request corresponding to the acquisition request to the device management unit 104.

As described above, the information processing apparatus 100 includes the device management unit 104, the device search management unit 106, the device operating unit 108, the storage unit 110, the receiving unit 112, and the queue 114 in the lower layer below the boundary of API.

The receiving unit 112 receives management information of each device from the various devices such as the projector 200 and the MFP 202 in a data format corresponding to each of the devices and stores the management information in the queue 114. The receiving unit 112 functions as an interface, which transmits and receives data between the information processing apparatus 100 and each device, and also functions as an API. Therefore, if each device is compatible with the API of the receiving unit 112, each device can transfer various data, such as management information, to the information processing apparatus 100. In other words, each device can be managed by the information processing apparatus 100.

The receiving unit 112 may receive the management information by acquiring management information of each device from the various devices such as the projector 200 and the MFP 202 in the data format corresponding to the respective devices (a pull method) or may receive the management information by means of transmission of the management information from the various devices such as the projector 200 and the MFP 202 (a push method).

The queue 114 is a first-in first-out (FIFO) queue and is generated on a storage medium, such as a memory.

The management information in the data format of each device stored in the queue 114 is read by the device management unit 104 at predetermined time intervals and is stored in the storage unit 110.

The storage unit 110 is a storage medium, such as a hard disk drive (HDD) and a flash memory, that stores therein various data.

In the present embodiment, the storage unit 110 stores therein the management information in the data format of each device acquired from each device, a first conversion rule, a model code database (hereinafter, referred to as a "model code DB"), and a master database of management information of each device (hereinafter, referred to as a "management information MDB"), for example.

The management information MDB is registered in the storage unit 110 for each device when each device is connected to the information processing apparatus 100 for the first time via the network. FIG. 3 is a view for explaining an example of the management information MDB.

As illustrated in FIG. 3, the management information MDB stores therein an information ID, an item name, a data type, a unit, the maximum value, and the minimum value in a manner associated with one another. As illustrated in FIG. 3, the information ID is information for uniquely identifying each item name. The item name is a name of a management item. Specifically, the item name is an item name of each management item of a processing item unique to each device, such as a device ID, a product name, a model code, and a firmware version, and of a processing item that changes depending on usage of each device, such as time of use, power consumption, and a $CO_2$ reduction. In other word, the management information MDB stores therein an information ID, a data type, a unit, the maximum value, and the minimum value for each processing item unique to each device and each processing item that changes depending on usage of each device.

The data type and the unit correspond to the data format of each device in the present embodiment. The data format is a data format unique to each device and a unit of each piece of data, for example, and is not limited to the data type and the unit.

The data type is a data format of data corresponding to each processing item received from a corresponding device. The unit is a unit of data corresponding to each processing item. The maximum value and the minimum value are the maximum value of a value corresponding to each processing item and the minimum value of the value, respectively, and are updated appropriately by processing performed by the device management unit 104, which will be described later.

The management information MDB is registered in the storage unit 110 every time a new device is connected to the information processing apparatus 100 via the network.

The management information MDB may be registered in the storage unit 110 for each device. In the present embodiment, however, an explanation will be made of the case where the management information MDB is registered in the storage unit 110 for each model to which each device belongs.

FIG. 4 is a view for explaining an example of the model code DB. As illustrated in FIG. 4, the model code DB stores therein a model code that is identification information of a model to which each device belongs and a management information ID for identifying management information MDB corresponding to each model code in a manner associated with each other.

FIG. 5 is a view for explaining an example of management information in the data format of each device acquired from each device. As illustrated in FIG. 5, the management information acquired from each device includes an information ID and a value corresponding to each information ID.

The information ID corresponds to the information ID in the management information MDB illustrated in FIG. 3. In other words, the management information in the data format of each device acquired from each device indicates an information ID of a processing item unique to each device and an actual value corresponding to the information ID and an information ID of a processing item that changes depending on usage of each device and an actual value corresponding to the information ID in the data format of each device.

As described above, the management information in the data format of each device is stored in the queue 114 in response to an acquisition request for management information issued from the information processing apparatus 100, for example. Subsequently, the management information is read by the device management unit 104 at predetermined time intervals and is stored in the storage unit 110.

The first conversion rule is a conversion rule for converting management information in each data format of a plurality of different types of devices into management information in the data format common to these devices. FIG. 6 is a view for explaining an example of the first conversion rule. As illustrated in FIG. 6, the first conversion rule defines, for each information ID of each processing item, information indicating a first common data format that is a common data format corresponding to the processing item and information indicating a common unit that is a common unit corresponding to the processing item. The first conversion rule simply needs to be a conversion rule for converting management information in each data format of a plurality of different types of devices into management information in the first common data format common to these devices and is not limited to the aspect illustrated in FIG. 6.

Referring back to FIG. 2, the device management unit 104 manages each device connected to the network. The device management unit 104 includes a management control unit 120, a conversion unit 122, and an information control unit 124.

The management control unit 120 receives, from the device management application 102 via the API, a processing request corresponding to an acquisition request in which a device ID is specified and which is received from the operation terminal 300. The management control unit 120 then transmits the processing request thus received to the information control unit 124.

The information control unit 124 reads management information in the data format of each device stored in the queue 114 and stores the management information in the storage unit 110. At this time, the information control unit 124 issues a first conversion request to the conversion unit 122. The first conversion request is a signal for instructing to convert the management information in the data format of each device stored in the storage unit 110 into management information in the first common data format based on the first conversion rule stored in the storage unit 110.

If no management information MDB corresponding to the device ID included in the processing request is stored in the storage unit 110, the management control unit 120 transmits a device search request for the device ID to a device search unit 116, which will be described later, of the device search management unit 106. The device search unit 116, which will be described later, transmits an acquisition request for the management information MDB to each of the devices connected to the network to acquire the management information MDB from each of the devices (described later in detail). The device search unit 116 then stores the management information MDB thus acquired in the storage unit 110.

If a first conversion request (described later in detail) is issued at predetermined time intervals or from the information control unit 124, the conversion unit 122 converts the management information in the data format of each device stored in the storage unit 110 into management information in the first common data format based on the first conversion rule stored in the storage unit 110. The conversion unit 122 then stores the management information in the first common data format thus converted in the storage unit 110 in a manner associated with the device ID of each device.

In detail, the conversion unit 122 reads, for each piece of management information of the same device ID, the management information in the data format of each device stored in the storage unit 110. The conversion unit 122 then reads the item name of the processing item identified by the information ID in each piece of the management information from the management information MDB corresponding to the model code or the device ID included in the management information. Subsequently, the conversion unit 122 calculates, as an actual value corresponding to each processing item, the sum of the values of the processing items that change depending on usage of the device (that are time of use, power consumption, and a $CO_2$ reduction in the present embodiment) among the values of the processing items included in the management information.

Furthermore, the conversion unit 122 reads the data format of the value corresponding to each processing item included in the management information in the data format of each device stored in the storage unit 110 from the management information MDB. The conversion unit 122 then converts the data format of the actual value corresponding to each processing item into the first common data format (e.g., a common data format and a common unit) of the corresponding processing item defined by the first conversion rule. In the same manner as described above, the conversion unit 122 converts the data format of the value corresponding to the information ID of the processing item unique to each device, such as a device ID, corresponding to the information ID included in the management information in the data format of each device into the first common data format of the corresponding processing item defined by the first conversion rule.

The conversion unit 122 then registers the management information including an item name of a processing item unique to each device, such as a device ID, and the value corresponding to the processing item converted into the first common data format and an item name of a processing item that changes depending on usage of the device (that is time of use, power consumption, or a $CO_2$ reduction in the present embodiment) and the value corresponding to the processing item converted into the first common data format in the storage unit 110 as the management information in the first common data format corresponding to the device ID in a manner associated with the device ID.

The conversion into the first common data format performed by the conversion unit 122 may be performed at predetermined time intervals, performed when the information control unit 124 issues the first conversion request, or performed every time management information is newly registered in the storage unit 110 via the queue 114. In the present embodiment, every time management information in the data format of each device is newly stored in the queue 114 from each device via the receiving unit 112, the information control unit 124 registers the management information in the storage unit 110 and issues the first conversion request to the conversion unit 122. Therefore, in the present embodiment, the latest management information in the first common data format is stored in the storage unit 110 for each device ID.

The information control unit 124 receives a processing request from the management control unit 120. The information control unit 124 then reads management information in the first common data format corresponding to the device identified by the device ID specified in the processing request thus received from the storage unit 110 and transmits the management information to the device management application 102 via the management control unit 120. The management information in the first common data format is obtained by converting management information in the data format of each device into management information in the first common data format common to a plurality of devices by the conversion unit 122 as described above.

The device management application 102 transmits the management information in the first common data format received from the device management unit 104 to the operation terminal 300 that transmits the acquisition request corresponding thereto as described above.

Furthermore, the information control unit 124 reads the management information in the data format of each device stored in the queue 114 and stores the management information in the storage unit 110. At this time, the information control unit 124 issues the first conversion request to the conversion unit 122.

The device search management unit 106 searches for and manages devices connectable to the network in the information processing system. The device search management unit 106 includes the device search unit 116 and a capability management unit 118.

The device search unit 116 transmits an acquisition request for management information to each device connected to the network at predetermined time intervals. The device search unit 116 acquires, from a device newly connected to the network, a device ID of the device and stores the device ID in the storage unit 110. If a device search request of a device ID is received from the management control unit 120, the device search unit 116 transmits an acquisition request of the device ID and the management information MDB to each device connected to the network and acquires the device ID and the management information MDB from each device. The device search unit 116 then registers the device ID and the management information MDB thus acquired in the storage unit 110.

The capability management unit 118 is a storage medium, such as an HDD and a flash memory, that stores therein the management information in the data format of each device received from each device. The device operating unit 108 performs control on each device.

An explanation will be made of management performed in the information processing system and the information processing apparatus 100 with the configuration described above according to the present embodiment using a specific example.

Figure 7:
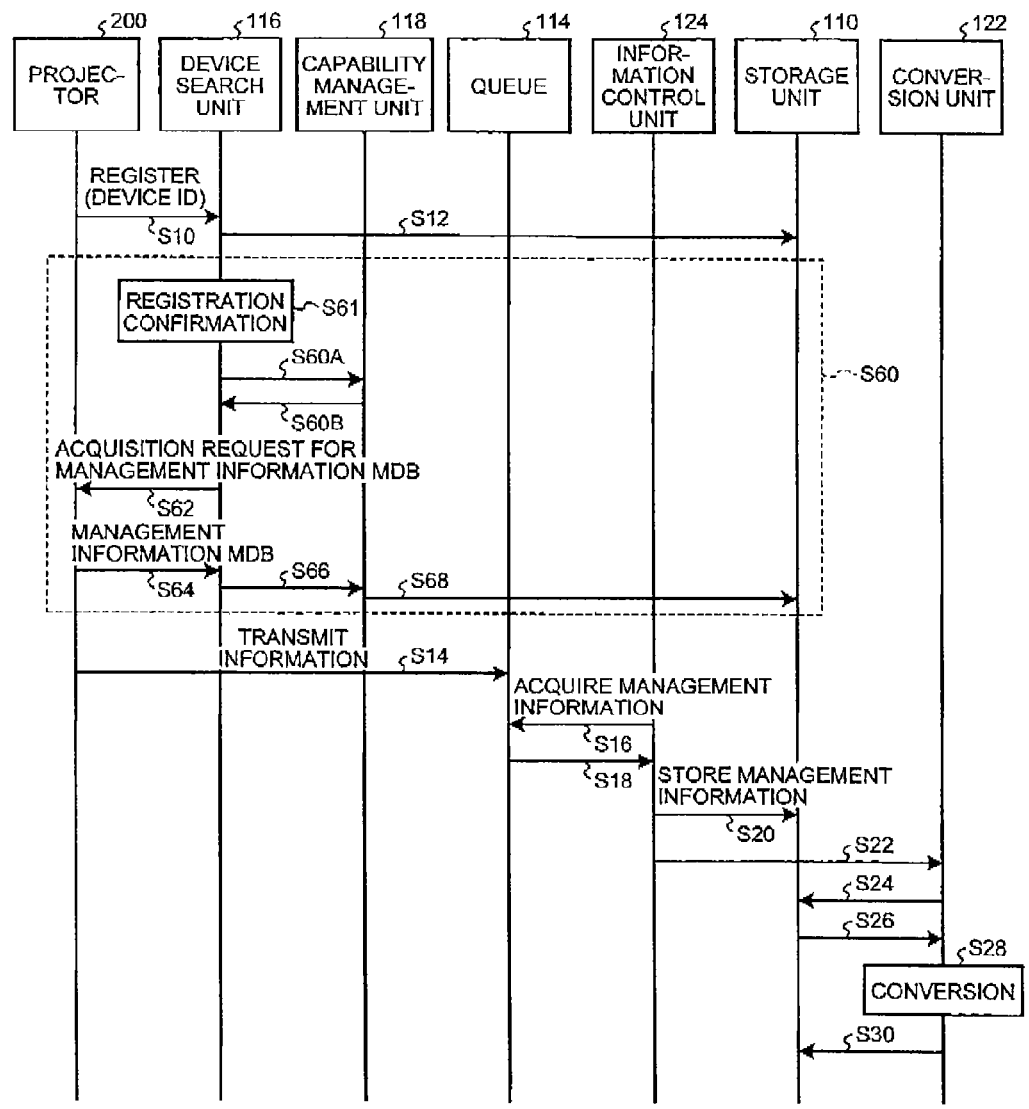
FIG. 7 is a sequence diagram of memory conversion according to the first embodiment.

FIG. 7 is a sequence diagram of memory conversion in the management process.

While the explanation will be made using the projector 200 as an example of the device connected to the network in the information processing system in FIG. 7, the same applies to the case where another device is connected.

When the user operates a power switch of the projector 200, which is not illustrated, and power is supplied to the respective units included in the projector 200, the projector 200 comes into a state connected to the information processing apparatus 100 via the network. The projector 200 then transmits the device ID of the projector 200 to the information processing apparatus 100 (Step S10).

When the device search unit 116 of the information processing apparatus 100 receives the device ID, the device search unit 116 stores the device ID in the storage unit 110 as an ID of a device being in a state connected to the network (Step S12).

Subsequently, at the point of time where a value corresponding to each processing item in management information is changed, or alternatively, at predetermined time intervals, the projector 200 transmits management information of the projector 200 in the data format of the projector 200 to the information processing apparatus 100 (Step S14). The management information is registered in the queue 114 of the information processing apparatus 100.

The information control unit 124 of the information processing apparatus 100 acquires the management information in the data format of each device registered in the queue 114 at predetermined time intervals (Step S16 and Step S18) and stores the management information in the storage unit 110 (Step S20).

If the information control unit 124 stores new management information in the storage unit 110, the information control unit 124 transmits a first conversion request to the conversion unit 122 (Step S22). The conversion unit 122 that receives the first conversion request converts the management information in the data format of each device stored in the storage unit 110 into management information in the first common data format based on the first conversion rule stored in the storage unit 110 (Step S24, Step S26, and Step S28). The conversion unit 122 then stores the management information in the first common data format thus converted in the storage unit 110 in a manner associated with the device ID of the device (Step S30).

A new device may possibly be connected to the network in the information processing system. In this case, no information on the device (e.g., the management information MDB) is registered in the information processing apparatus 100. Therefore, the information processing system performs registration operation illustrated in Step S60 in FIG. 7.

In other words, the device search unit 116 of the information processing apparatus 100 receives the device ID from the projector 200 connected to the network at Step S10 and performs the operation at Step S12. Subsequently, the device search unit 116 performs the operation at Step S60.

The device search unit 116 of the information processing apparatus 100 performs registration confirmation for determining whether the device ID received at Step S10 has already been registered (Step S61). In the present embodiment, the device search unit 116 performs the registration confirmation by determining whether the device ID received at Step S10 is registered in the capability management unit 118 (Step S60A and Step S60B). The device search unit 116 may perform the registration confirmation by determining whether the management information MDB corresponding to the device ID received at Step S10 is registered in the storage unit 110.

In the registration confirmation, if the device search unit 116 determines that the device ID received at Step S10 has already been registered, the registration at Step S60 is terminated, and the system control goes to Step S14.

By contrast, if the device search unit 116 determines that the device ID received at Step S10 is not registered, the system control goes to Step S62. At Step S62, the device search unit 116 transmits an acquisition request for management information MDB to the projector 200 that is a device identified by the device ID received at Step S10 (Step S62).

The projector 200 that receives the acquisition request for management information MDB transmits the management information MDB to the information processing apparatus 100 (Step S64). The device search unit 116 of the information processing apparatus 100 that receives the management information MDB stores the management information MDB thus received in the capability management unit 118 (Step S66). The capability management unit 118 stores the management information MDB in the storage unit 110 (Step S68).

By performing the registration operation (Step S60) from Step S61 to Step S68, the device ID and the management information MDB of the device newly connected to the network are registered in the information processing apparatus 100.

Figure 8:
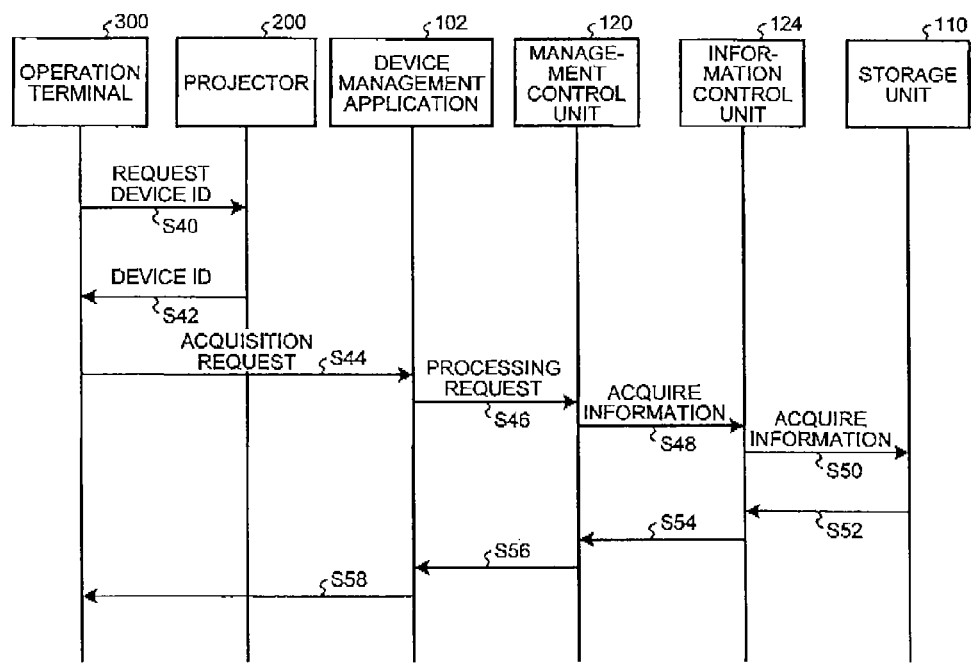
FIG. 8 is a sequence diagram of information notification according to the first embodiment.

Information notification in the management performed by the information processing apparatus 100 will now be described specifically. FIG. 8 is a sequence diagram of the information notification performed in the information processing system and the information processing apparatus 100 according to the first embodiment.

An assumption is made that the user who carries the operation terminal 300 is present near the projector 200 serving as the device to be a target of a processing request, for example, and that the operation terminal 300 desires to acquire the management information of the projector 200.

In this case, the user acquires the device ID of the device to be a target of a processing request. In the present embodiment, the user issues an operation instruction from the operation terminal 300 to request the device ID of the projector 200 from the projector 200 serving as a device to be a target of the processing request (Step S40 and Step S42).

The user who carries the operation terminal 300 does not necessarily acquire the device ID of a device to be a target of processing by the method described above. The user may acquire the device ID by visually checking the device ID on a display screen that displays the device ID of the projector 200 or by visually checking the device ID written in a management sticker put on the housing of the projector 200, for example.

Subsequently, the operation terminal 300 transmits the device ID thus received and an acquisition request for management information of the device identified by the device ID (the projector 200 in this example) to the information processing apparatus 100 (Step S44).

The device management application 102 of the information processing apparatus 100 that receives the acquisition request in which the device ID is specified uses the API to transmit a processing request corresponding to the acquisition request to the management control unit 120 (Step S46).

The management control unit 120 receives, from the device management application 102 via the API, the processing request corresponding to the acquisition request in which the device ID is specified and which is received from the operation terminal 300. The management control unit 120 then transmits the processing request thus received to the information control unit 124 (Step S48).

The information control unit 124 receives the processing request from the management control unit 120. The information control unit 124 then reads management information in the first common data format corresponding to the device identified by the device ID specified in the processing request thus received from the storage unit 110 (Step S50 and Step S52). The information control unit 124 then transmits the management information in the first common data format thus read to the device management application 102 via the management control unit 120 (Step S54 and Step S56). The management information in the first common data format is information obtained by converting management information in the data format of each device into management information in the first common data format common to a plurality of devices by the conversion unit 122 as described above.

The device management application 102 transmits the management information in the first common data format received from the device management unit 104 to the operation terminal 300 that transmits the acquisition request corresponding thereto (Step S58).

As described above, in the information processing apparatus 100 according to the present embodiment, the conversion unit 122 converts the management information of each device received in the data format of each device from each device into management information in the first common data format based on the first conversion rule stored in the storage unit 110.

Thus, if the information processing apparatus 100 receives an acquisition request of the management information of each device from the operation terminal 300, for example, the information processing apparatus 100 can transmit the management information in the first common data format to the operation terminal 300. Therefore, even if a new type of device is added as a device to be managed, the information processing apparatus 100 according to the present embodiment can provide the management information of each device in a format common to a plurality of devices (the first common data format).

Accordingly, even if a new type of device is added as a device to be managed, the information processing apparatus 100 according to the present embodiment can readily support the device.

The device management application 102 of the information processing apparatus 100 according to the present embodiment uses the API to transmit an acquisition request in which the device ID is specified and which is received from the operation terminal 300 to the device management unit 104 as a processing request corresponding to the acquisition request. Furthermore, the device management application 102 receives management information that corresponds to the device identified by the device ID specified in the processing request and that is converted into the first common data format common to a plurality of devices and the device ID specified in the processing request from the device management unit 104. The device management application 102 then transmits the management information in the first common data format thus received to the device identified by the device ID thus received.

Thus, even if a device in a new data format is connected to the network, the device management application 102 can transmit the management information of the device to the operation terminal 300 regardless of the data format of the device.

The device ID included in an acquisition request is not limited to one device ID and may be a plurality of device IDs. If an acquisition request includes a plurality of device IDs, the information processing apparatus 100 can provide management information corresponding to each of the device IDs included in the acquisition request in the first common data format to the operation terminal 300.

Second Embodiment

In the first embodiment, the operation terminal 300 transmits a device ID (identification information) for uniquely identifying a device to be a target of a processing request made by the user and an acquisition request for management information of the device identified by the device ID to the information processing apparatus (information processing apparatus 100 in the first embodiment). In a second embodiment, the operation terminal 300 transmits a device ID and a performance request to cause the device identified by the device ID to perform specific processing, to an information processing apparatus.

The functions of each device are the same as those in the first embodiment.

Figure 9:
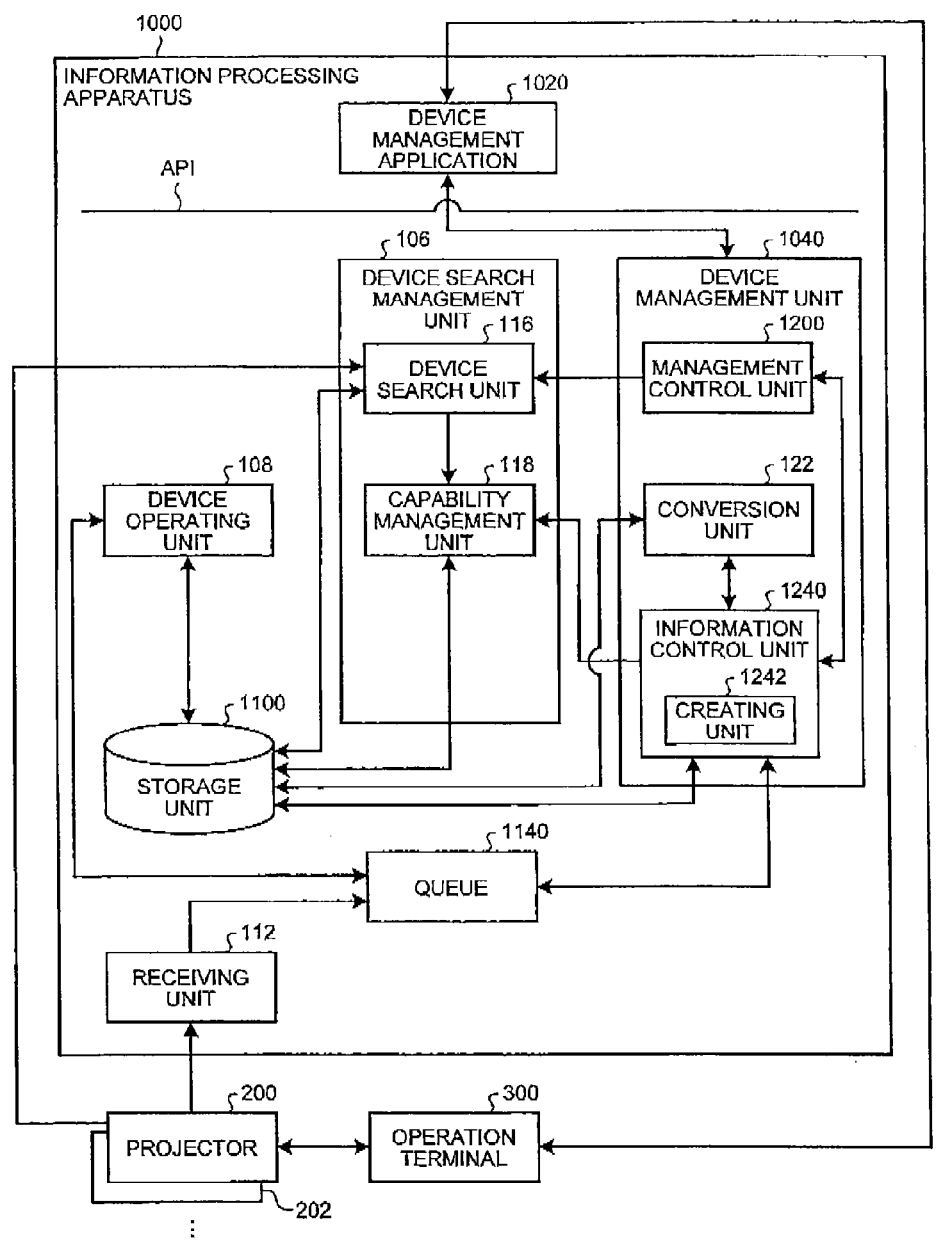
FIG. 9 is a block diagram of a functional configuration of an information processing apparatus according to a second embodiment.

FIG. 9 is a block diagram of a functional configuration of an information processing apparatus 1000 according to the present embodiment.

As illustrated in FIG. 9, the information processing apparatus 1000 includes a device management application 1020 (a performing unit), a device management unit 1040, a device operating unit 108, a storage unit 1100 (a first storage unit), a receiving unit 112, a queue 1140 (a second storage unit), and an API.

The information processing apparatus 1000 has the device management application 1020 in the upper layer above the boundary of API. Furthermore, the information processing apparatus 1000 has the device management unit 1040, the device operating unit 108, the storage unit 1100, the receiving unit 112, and the queue 1140 in the lower layer below the boundary of API.

In addition to the functions in the first embodiment, the device management application 1020 receives, from the operation terminal 300, a performance request in which a device ID is specified.

In other words, the device management application 1020 receives, from the operation terminal 300, an acquisition request in which a device ID is specified or a performance request in which a device ID is specified. The operation performed when the device management application 1020 receives an acquisition request in which a device ID is specified is the same as that in the first embodiment.

The performance request in which a device ID is specified includes a device ID (identification information) of a device to be a target of a processing request made by the user and a performance request to cause the device identified by the device ID to perform specific processing.

The device management application 1020 uses the API to transmit the performance request in which the device ID is specified and which is received from the operation terminal 300 to the device management unit 1040 as a processing request corresponding to the performance request.

Here, the API in the information processing apparatus 1000 according to the second embodiment can receive various requests, such as an acquisition request and a performance request, issued from the device management application 1020 using a predefined function, such as parameter specification, in the same manner as in the first embodiment. If the API receives an acquisition request by using the function, the API issues a processing request for acquisition of management information of the device ID specified in the acquisition request to the device management unit 1040. Thus, the device management application 1020 issues the processing request corresponding to the acquisition request received from the operation terminal 300 to the device management unit 1040 via the API. This operation is the same as that in the first embodiment.

In addition, if the API in the information processing apparatus 1000 according to the present embodiment receives a performance request by using the function, the API issues a processing request for creation of processing performance information for causing the device identified by the device ID specified in the performance request to perform the processing specified in the performance request to the device management unit 1040. Thus, the device management application 1020 issues the processing request corresponding to the performance request received from the operation terminal 300 to the device management unit 1040 via the API. The processing performance information will be described later in detail.

In addition to the acquisition request function described in the first embodiment, a performance request function is provided as the API in the second embodiment. Because the acquisition request function is the same as that in the first embodiment, the explanation thereof will be omitted.

2) Performance Request
<Input parameter>
Device ID
Processing to be performed
Parameter Therefore, by calling the performance request function that specifies the input parameter, the device management application 1020 issues a processing request corresponding to the performance request to the device management unit 1040.

The queue 1140 is a FIFO queue and is generated on a storage medium, such as a memory. In the same manner as in the first embodiment, the queue 1140 stores therein management information in the data format of each device. The management information in the data format of each device is read by the device management unit 1040 at predetermined time intervals and is stored in the storage unit 1100 in the same manner as in the first embodiment.

In the present embodiment, the queue 1140 further stores therein processing performance information (described later in detail) created by the device management unit 1040 based on the performance request specified by the processing request in a manner associated with a device ID of a device to be caused to perform the processing based on the processing performance information.

Each device, such as the projector 200 and the MFP 202, connected to the network checks the queue 1140 at predetermined time intervals. If processing performance information corresponding to its own device ID is stored in the queue 1140, each device reads the processing performance information corresponding to its own device ID and performs processing specified in the processing performance information.

The storage unit 1100 is a storage medium, such as an HDD and a flash memory, that stores therein various data.

In the same manner as in the first embodiment, the storage unit 1100 stores therein management information in the data format of each device acquired from each device, a first conversion rule, a model code database (hereinafter, referred to as a "model code DB"), and a master database of management information of each device (hereinafter, referred to as a "management information MDB"), for example.

The storage unit 1100 further stores therein a command management master database of each device (hereinafter, referred to as a "command management MDB") and a command database of each device (hereinafter, referred to as a "command DB").

The command management MDB is registered in the storage unit 1100 for each device when each device is connected to the information processing apparatus 1000 for the first time via the network. By including the registration contents of the command management MDB in the management information MDB, the command management MDB may be registered in the storage unit 1100 in a manner included in the management information MDB.

FIG. 10 is a view for explaining an example of the command management MDB. As illustrated in FIG. 10, the command management MDB stores therein a command ID, an item name, and a data type in a manner associated with one another. As illustrated in FIG. 10, the command ID is information for uniquely identifying a command for performing the corresponding processing that can be performed by each device. The item name in the command management MDB is information indicating the meaning of a parameter of a command identified by each command ID. The data type is information indicating a data layout or a data format of a parameter of a command for causing a corresponding device to perform the corresponding processing, for example.

The command for performing processing in each device include a change of various settings, such as a network setting, new registration of various data, printing, projection, and reading of an image; however, the command is not limited thereto.

The command DB is registered in the storage unit 1100 for each device when each device is connected to the information processing apparatus 1000 for the first time via the network. By including the registration contents of the command DB in the management information MDB, the command DB may be registered in the storage unit 1100 in a manner included in the management information MDB.

FIG. 11 is a view for explaining an example of the command DB. As illustrated in FIG. 11, the command DB stores therein a type of processing performed by each device, a command ID, and a command in a manner associated with one another. The command ID is the same as the command ID in the command management MDB. The processing performed by each device is executable processing in each device. While examples of the processing include processing for transmitting information of an image to be output, such as printing, projection, and display, and processing for inputting various types of information, the processing is not limited to input and output processing of data. Examples of the processing further include processing for changing various types of setting information, such as a network setting. In other words, the command DB stores therein, for each executable processing of each device, a command ID of a command for performing the processing and the command in a manner associated with each other. The command DB may further include a parameter corresponding to the command.

Referring back to FIG. 9, the device management unit 1040 manages each device connected to the network. The device management unit 1040 includes a management control unit 1200, a conversion unit 122, and an information control unit 1240. The conversion unit 122 is the same as that in the first embodiment.

The management control unit 1200 receives, from the device management application 1020 via the API, a processing request corresponding to an acquisition request in which a device ID is specified and which is received from the operation terminal 300. The management control unit 1200 then transmits the processing request thus received to the information control unit 1240. This operation is the same as that in the first embodiment.

In the present embodiment, the management control unit 1200 further receives, from the device management application 1020 via the API, a processing request corresponding to a performance request in which a device ID is specified and which is received from the operation terminal 300. The management control unit 1200 then transmits the processing request thus received to the information control unit 1240.

The information control unit 1240 receives a processing request from the management control unit 1200. If the processing request thus received is a processing request corresponding to an acquisition request, the information control unit 1240 reads management information in the first common data format corresponding to the device identified by the device ID specified in the processing request from the storage unit 1100 and transmits the management information to the device management application 1020 via the management control unit 1200 in the same manner as in the first embodiment. By reading a parameter included in the processing request thus received, the information control unit 1240 determines that the processing request thus received is a processing request corresponding to an acquisition request.

In this case, the device management application 1020 transmits the management information in the first common data format received from the device management unit 1040 to the operation terminal 300 that transmits the acquisition request corresponding thereto.

Furthermore, in the same manner as in the first embodiment, the information control unit 1240 reads the management information in the data format of each device stored in the queue 1140 and stores the management information in the storage unit 1100. At this time, the information control unit 1240 issues the first conversion request to the conversion unit 122 as described above.

By contrast, if the processing request received from the management control unit 1200 is a processing request corresponding to a performance request, the information control unit 1240 creates processing performance information based on the performance request specified by the processing request and stores the processing performance information in the queue 1140.

In more detail, the information control unit 1240 includes a creating unit 1242.

If the processing request received from the management control unit 1200 is a processing request corresponding to a performance request, the creating unit 1242 creates processing performance information based on the performance request specified by the processing request. By reading a parameter included in the processing request thus received, the creating unit 1242 determines that the processing request thus received is a processing request corresponding to a performance request.

The processing performance information is information including a command for causing each device of the device ID specified in the processing request to perform specific processing to be performed that is specified in the processing request and including a parameter.

The creating unit 1242 reads the command management MDB and the command DB corresponding to the device ID specified in the processing request from the storage unit 1100. At this time, if a plurality of device IDs are specified in the processing request, the creating unit 1242 reads the command management MDB and the command DB corresponding to each of the device IDs from the storage unit 1100.

The creating unit 1242 then reads a command corresponding to the processing to be performed that is specified in the processing request and a data type corresponding to the command ID of the command for each device ID thus specified. Subsequently, the creating unit 1242 creates processing performance information including the command corresponding to the processing to be performed that is specified in the processing request and a parameter obtained by converting the parameter corresponding to the processing specified in the processing request into the data type thus read for each device ID.

The creating unit 1242 creates the processing performance information for each device ID specified in the processing request and stores the processing performance information in the queue 1140 in a manner associated with the device ID corresponding thereto. Instead of the command included in the processing performance information, a command ID may be used. In this case, each device stores therein information indicating a command corresponding to the command ID in advance.

FIG. 12 is a view for explaining an example of the processing performance information. As illustrated in FIG. 12, the processing performance information includes a command ID and a parameter. As described above, a command may be used instead of the command ID.

Each device, such as the projector 200 and the MFP 202, connected to the network checks the queue 1140 at predetermined time intervals. If processing performance information corresponding to its own device ID is stored in the queue 1140, each device reads the processing performance information corresponding to its own device ID and performs the processing specified in the processing performance information.

An explanation will be made of management performed by the information processing apparatus 1000 with the configuration described above according to the present embodiment using a specific example.

Memory conversion in the management is the same as that in the first embodiment (refer to FIG. 7). The memory conversion in the second embodiment is different from that in the first embodiment in that, when the management information MDB is registered, the command management MDB and the command DB are also received from the device and registered in the storage unit 1100.

Furthermore, information notification in the management is the same as that in the first embodiment (refer to FIG. 8).

Figure 13:
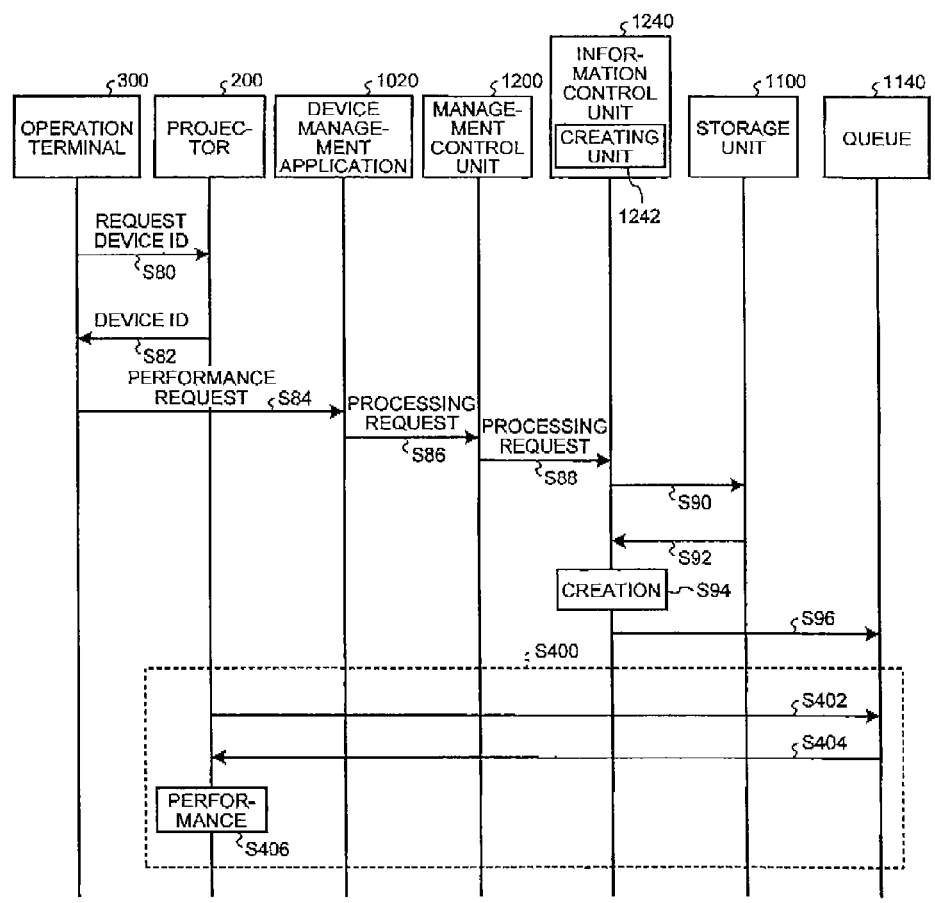
FIG. 13 is a sequence diagram of device control according to the second embodiment.

Device control in the management performed by the information processing apparatus 1000 will be described below. FIG. 13 is a sequence diagram of the device control performed in the information processing system and the information processing apparatus 1000 according to the present embodiment.

An assumption is made that the user who carries the operation terminal 300 desires to issue a performance request for specific processing to one or each of a plurality of devices, for example.

In this case, the user acquires the device ID of the device to be a target of the processing request. In the present embodiment, the user issues an operation instruction using the operation terminal 300 to request the device ID of the projector 200 to the projector 200 to be the target of the processing request and receives the device ID (Step S80 and Step S82).

Similarly to the first embodiment, the user who carries the operation terminal 300 does not necessarily acquire the device ID of the device to be the target of the processing by the method described above.

Subsequently, the operation terminal 300 transmits the device ID of the device to be the target of the processing and a performance request for causing the device identified by the device ID (the projector 200 in this example) to perform the specific processing to the information processing apparatus 1000 (Step S84).

The device management application 1020 of the information processing apparatus 1000 that receives the performance request in which the device ID is specified uses the API to transmit a processing request corresponding to the performance request to the management control unit 1200 (Step S86).

The management control unit 1200 receives, from the device management application 1020 via the API, the processing request corresponding to the performance request in which the device ID is specified and which is received from the operation terminal 300. The management control unit 1200 then transmits the processing request thus received to the information control unit 1240 (Step S88).

The creating unit 1242 of the information control unit 1240 receives the processing request from the management control unit 1200. The information control unit 1240 then reads, for each device ID specified in the processing request thus received, a command corresponding to a function specified in the processing request and a data type corresponding to the command ID of the command corresponding to the device ID from the storage unit 1100 (Step S90 and Step S92).

The creating unit 1242 then creates processing performance information including the command or the command ID corresponding to the function to be performed that is specified in the processing request and a parameter that corresponds to the function specified in the processing request and is converted into the data type corresponding to the command ID for each device ID thus specified (Step S94).

Subsequently, the creating unit 1242 stores the processing performance information thus created in the queue 1140 in a manner associated with the device ID corresponding thereto (Step S96).

Each device connected to the network performs read processing for reading the processing performance information from the queue 1140 at predetermined time intervals (Step S400).

In more detail, the projector 200, which is an example of each device, reads the processing performance information corresponding to the device ID of the projector 200 (Step S402 and Step S404). If no processing performance information corresponding to the device ID is stored in the queue 1140, the read processing at Step S400 is terminated.

In accordance with the command included in the processing performance information thus read, the projector 200 performs the corresponding processing (Step S406).

An assumption is made that the operation terminal 300 transmits a plurality of device IDs of devices connected to the information processing system and a performance request for causing the devices of the device IDs to change the network setting to a certain parameter to the information processing apparatus 1000 as a performance request, for example.

In this case, the information processing apparatus 1000 creates processing performance information including a command (or a command ID) for causing the device identified by each device ID specified in the performance request to change the network setting to the parameter specified in the performance request and including a parameter and stores the processing performance information in the queue 1140. Each device connected to the network performs the processing in accordance with the command included in the processing performance information corresponding to its own device ID stored in the queue 1140, thereby changing the network setting to the parameter specified in the performance request.

As described above, in the information processing apparatus 1000 according to the present embodiment, if a processing request received from the operation terminal 300 is a performance request, the creating unit 1242 creates processing performance information based on the performance request specified by the processing request. The processing performance information is information including a command (or a command ID) for causing each device of the device ID specified in the processing request to perform a function to be performed that is specified in the processing request and including a parameter. Each command and each parameter are commands that can be performed by each device identified by each device ID and are in the data format of each device.

Therefore, by accessing the queue 1140 of the information processing apparatus 1000 and performing the processing specified in the processing performance information corresponding to each device stored in the queue 1140, each device connected to the network can perform the processing specified by the user.

Accordingly, even if a new type of device is added as a device to be managed, the information processing apparatus 1000 according to the present embodiment can readily support the device.

Third Embodiment

In the first embodiment, the operation terminal 300 transmits a device ID (identification information) for uniquely identifying a device to be a target of a processing request made by the user and an acquisition request for management information of the device identified by the device ID to the information processing apparatus (information processing apparatus 100 in the first embodiment). In a third embodiment, the operation terminal 300 transmits a history acquisition request to an information processing apparatus.

The functions of each device are the same as those in the first embodiment.

Figure 14:
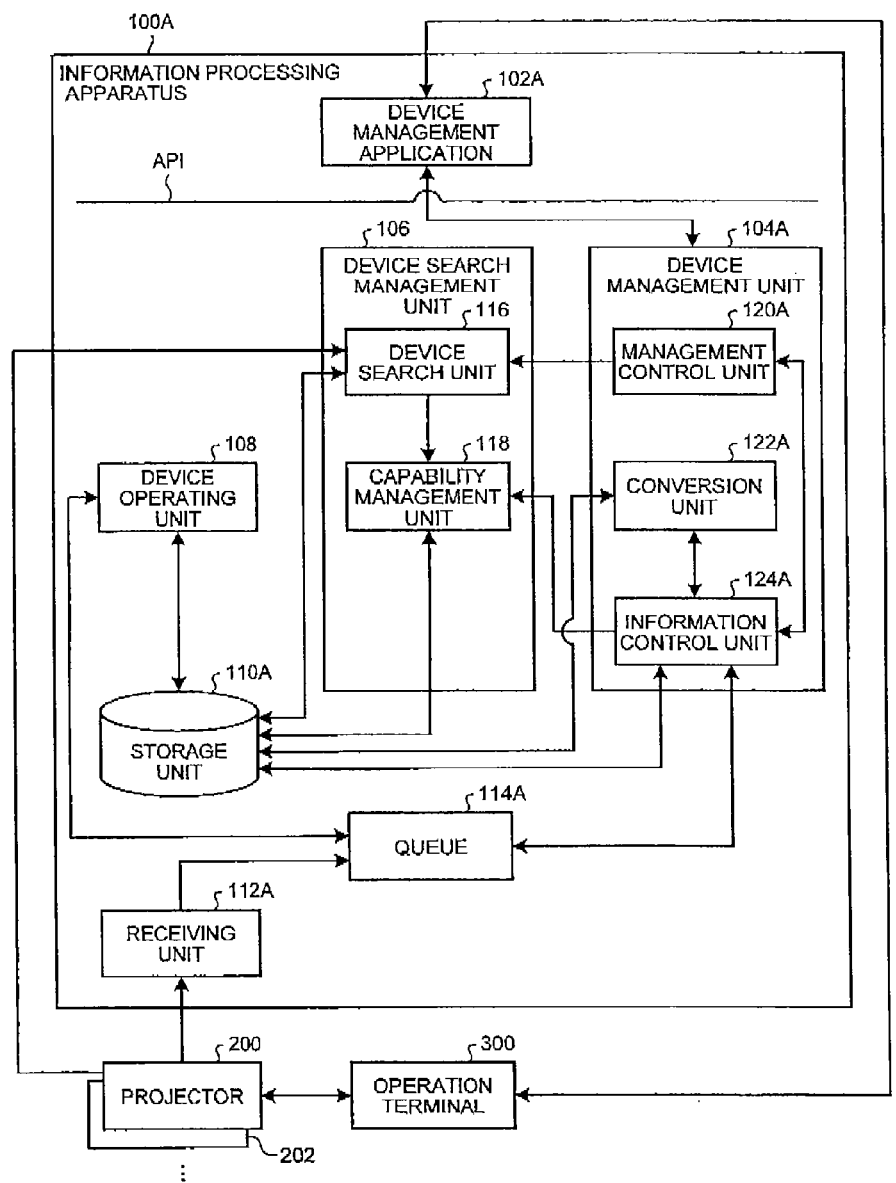
FIG. 14 is a block diagram of a functional configuration of an information processing apparatus according to a third embodiment of the present invention.

FIG. 14 is a block diagram of a functional configuration of an information processing apparatus 100A according to the present embodiment.

As illustrated in FIG. 14, the information processing apparatus 100A includes a device management application 102A (a performing unit), a device management unit 104A, a device operating unit 108, a storage unit 110A (a first storage unit), a receiving unit 112A, a queue 114A, and an API.

The information processing apparatus 100A has the device management application 102A in the upper layer above the boundary of API. Furthermore, the information processing apparatus 100A has the device management unit 104A, the device operating unit 108, the storage unit 110A, the receiving unit 112A, and the queue 114A in the lower layer below the boundary of API. The device operating unit 108 and a device search management unit 106 are the same as those in the first embodiment.

In addition to the functions in the first embodiment, the device management application 1020 receives a history acquisition request from the operation terminal 300. In other words, the device management application 102A receives an acquisition request in which a device ID is specified or a history acquisition request.

The device management application 102A may further receive a performance request in which a device ID is specified from the operation terminal 300 in the same manner as in the second embodiment. The processing performed when the device management application 102A receives an acquisition request in which a device ID is specified is the same as that in the first embodiment. Furthermore, the processing performed when the device management application 102A receives a performance request in which a device ID is specified is the same as that in the second embodiment.

Each device connectable to the information processing apparatus 100A creates processing history information. The processing history information created by each device includes histories of a plurality of types of processing. While examples of the processing include acquisition of a specific file and processing that can be performed by each device (e.g., printing, display, and error restoration), the processing is not limited thereto.

The history acquisition request is an acquisition request for processing history information of each device. In the present embodiment, an explanation will be made of the case where the history acquisition request is an acquisition request for a processing result of a specific item included in a history of specific processing among pieces of processing history information in each device.

Specifically, the history acquisition information includes specification information for specifying processing to be acquired, identification information of an item to be acquired (hereinafter, also referred to as an item name), and an acquisition request of a record content corresponding to the item identified by the item name. The specification information simply needs to be information that can specify the processing to be acquired.

The device management application 102A uses the API to transmit a history acquisition request to the device management unit 104A as a processing request corresponding to the history acquisition request.

The API in the information processing apparatus 100A according to the third embodiment can receive various requests, such as a history acquisition request, an acquisition request, and a performance request, issued from the device management application 102A using a predefined function, such as parameter specification, in the same manner as in the first embodiment.

If the API receives an acquisition request by using the function, the API issues a processing request for acquisition of management information for the device ID specified in the acquisition request to the device management unit 104A. Thus, the device management application 102A issues the processing request corresponding to the acquisition request received from the operation terminal 300 to the device management unit 104A via the API. This operation is the same as that in the first embodiment.

If the API receives a performance request by using the function, the API issues a processing request for creation of processing performance information for causing the device of the device ID specified in the performance request to perform the processing specified in the performance request to the device management unit 104A. Thus, the device management application 102A issues the processing request corresponding to the performance request received from the operation terminal 300 to the device management unit 104A via the API. This operation is the same as that in the second embodiment.

If the API receives a history acquisition request by using the function, the API issues a history processing request corresponding to the history acquisition request in the processing history information acquired from each device to the device management unit 104A. Thus, the device management application 102A issues the history processing request corresponding to the history acquisition request received from the operation terminal 300 to the device management unit 104A via the API.

In addition to the acquisition request function described in the first embodiment and the performance request function described in the second embodiment, a history acquisition request function is provided as the API in the third embodiment. Because the acquisition request function is the same as that in the first embodiment and the performance request function is the same as that in the second embodiment, the explanations thereof will be omitted.

3) History Acquisition Request
<Input parameter>
Specification information for specifying processing to be acquired
Identification information of an item to be acquired (item name)
Parameter (including an acquisition request for a record content corresponding to the item identified by the item name included in the history of the processing specified by the specification information in the processing history information acquired from each device)
<Response>
Specification information for specifying processing to be acquired
Identification information of the item to be acquired (item name)
Parameter (record content in a second common data format)

Therefore, by calling the history acquisition request function that specifies the input parameter, the device management application 102A issues a history processing request corresponding to the history acquisition request to the device management unit 104A.

The queue 114A is a FIFO queue and is generated on a storage medium, such as a memory. In the same manner as in the first embodiment, the queue 114A stores therein management information in the data format of each device. The management information in the data format of each device is read by the device management unit 104A at predetermined time intervals and is stored in the storage unit 110A in the same manner as in the first embodiment.

The queue 114A further stores therein processing performance information created by the device management unit 104A based on the performance request specified by the processing request in a manner associated with a device ID of a device to be caused to perform processing based on the processing performance information. Because the processing performance information is the same as that in the second embodiment, the detailed explanation thereof will be omitted.

In the present embodiment, the queue 114A further stores therein processing history information in the data format of each device. The processing history information in the data format of each device is read by the device management unit 104A at predetermined time intervals and is stored in the storage unit 110A.

The management information in the data format of each device and the processing history information in the data format of each device stored in the queue 114A may be read and stored in the storage unit 110A when the device management unit 104A uses each piece of the information to perform the corresponding processing.

Every time the processing history information is updated in each device, each device, such as the projector 200 and the MFP 202, connected to the network transmits the processing history information in the data format of each device thus updated to the information processing apparatus 100A. The information processing apparatus 100A that receives the processing history information in the data format of each device from each device stores the processing history information thus received in the queue 114A.

When the processing history information is updated in each device, each device may transmit the history of processing thus updated alone to the information processing apparatus 100A.

In the same manner as in the second embodiment, each device checks the queue 114A at predetermined time intervals. If processing performance information corresponding to its own device ID is stored in the queue 114A, each device reads the processing performance information corresponding to its own device ID and performs the processing specified in the processing performance information.

The storage unit 110A is a storage medium, such as an HDD and a flash memory, that stores therein various data.

In the same manner as in the first embodiment, the storage unit 110A stores therein management information in the data format of each device acquired from each device, a first conversion rule, a model code DB, and a management information MDB of each device, for example. Furthermore, in the same manner as in the second embodiment, the storage unit 110A stores therein a command management MDB of each device and a command DB of each device.

In the present embodiment, the storage unit 110A further stores therein processing history information in the data format of each device acquired from each device, a log definition database (hereinafter, referred to as a "log definition DB"), a converted database (hereinafter, referred to as a "converted DB"), and a second conversion rule, for example.

FIGS. 15A to 15C are views for explaining examples of the processing history information in the data format of three devices. Each of FIGS. 15A to 15C illustrates a history of processing obtained when each device performs acquisition of data "/sample/data/1" stored in the information processing apparatus 100A as specific processing included in the processing history information. While an explanation will be made of the case where the three device are an MFP, a television conference terminal, and a projector in the present embodiment, the device is not limited thereto. Furthermore, the processing history information in the data format of each device may include not a history of one type of processing but histories of a plurality of types of processing. Each of FIGS. 15A to 15C simply illustrates an example thereof.

FIG. 15A is a view for explaining an example of the processing history information in a data format of an MFP. FIG. 15B is a view for explaining an example of the processing history information in a data format of a projector. FIG. 15C is a view for explaining an example of the processing history information in a data format of a television (TV) conference terminal.

Each piece of device history information is stored in the storage unit 110A in a manner associated with a device ID. The processing history information illustrated in FIG. 15A is stored in a manner associated with a device ID "MFP 1" (indicating an MFP), for example. The processing history information illustrated in FIG. 15B is stored in a manner associated with a device ID "projector 1" (indicating a projector). Similarly, the processing history information illustrated in FIG. 15C is stored in a manner associated with a device ID "TV conference terminal 1" (indicating a TV conference terminal).

As described above, the processing history information is information indicating a history of processing performed by each device. The processing history information is information indicating a record content corresponding to an item in accordance with a definition (schema) predetermined for each device (or for each model) in a description form (e.g., a data format and a unit) predetermined by the definition for the corresponding processing thus performed. Specifically, the data format of each device in the processing history information indicates an item name determined for each device and a description form of a record content corresponding to the item identified by the item name. In other words, the processing history information is a data format corresponding to each device or each model and may be different from one another.

While examples of the item recorded in the processing history information include a processing date and time, a processing state (status), a processing method, a processing content (data stored area), a processing result, and processing time, the item is not limited thereto. Furthermore, an arbitrary format is determined for the format and the unit of the record content corresponding to each item for each device. In the present embodiment, an explanation will be made of the case where the "processing content", which is an example of the item, is used as specification information for specifying processing to be acquired.

FIG. 15A is an example of the processing history information recorded by an MFP in the data format of the MFP. FIG. 15B is an example of the processing history information recorded by a projector in the data format of the projector. FIG. 15C is an example of the processing history information recorded by a TV conference terminal in the data format of the TV conference terminal.

As illustrated in FIGS. 15A, 15B, and 15C, when each device acquires the data "/sample/data/1" stored in the information processing apparatus 100A, data formats of the processing history information recorded by each device are different from one another.

Specifically, as illustrated in FIGS. 15A, 15B, and 15C, the record contents (e.g., formats and units) corresponding to the definitions of the item name or the item identified by the item name are different from one another. The processing history information illustrated in FIG. 15A, for example, indicates the processing time required for acquiring the data "/sample/data/1" on the information processing apparatus 100A by microseconds. In the example of FIG. 15A, the processing time is "3098.832" microseconds. In the example of FIG. 15A, no item name of the processing time is provided, and the processing time is indicated at the end of the processing history.

By contrast, the processing history information illustrated in FIG. 15B indicates the processing time required for acquiring the data "/sample/data/1" on the information processing apparatus 100A by milliseconds. In the example of FIG. 15B, the processing time is "4.075" milliseconds. In the present embodiment, the item name of the item indicating the processing time is represented as "total_runtime" in the projector. Similarly, the processing history information illustrated in FIG. 15C indicates the processing time required for acquiring the data "/sample/data/1" on the information processing apparatus 100A by milliseconds. In the example of FIG. 15C, the processing time is "3.999" milliseconds. In the present embodiment, the item name of the item indicating the processing time is represented as "total=" in the TV conference terminal.

FIG. 16A is a view for explaining the log definition DB. As illustrated in FIG. 16A, the log definition DB is a table that stores therein a device ID and a definition of processing history information (also referred to as a log definition) in a manner associated with each other.

FIG. 16B is a view for explaining the log definition of the MFP. FIG. 16C is a view for explaining the log definition of the projector. FIG. 16D is a view for explaining the log definition of the TV conference terminal.

The log definition is a log definition (schema) of a device ID corresponding thereto. In the present embodiment, the log definition is a data structure of the processing history information of the device identified by the device ID corresponding thereto. Specifically, the log definition defines the item name of an item recorded as the processing history information of the device identified by the device ID corresponding thereto and the data format and the unit, for example, of the record content corresponding to the item specified by each item name in order of being recorded in the processing history information.

FIG. 17 is a view for explaining an example of the second conversion rule.

The second conversion rule is a conversion rule for converting the data formats of the processing history information of a plurality of different types of devices into a second common data format serving as a data format common to these devices.

As illustrated in FIG. 17, the second conversion rule is a table that stores therein a common item name, a device ID, and an item name corresponding to the processing history information in the data format of each device in a manner associated with one another.

In the present embodiment, for example, the second conversion rule defines "totalTime" as a common item name indicating the processing time as illustrated in FIG. 17. Furthermore, in the second conversion rule, "ResponseTime" is associated with the device ID "MFP 1", "total_runtime" is associated with the device ID "projector 1", and "total" is associated with the device ID "TV conference terminal 1" as a corresponding item name in the processing history information of each device corresponding to the common item name "totalTime". Similarly, in the second conversion rule, the common item name, the device ID, and the corresponding item name in the processing history information in the data format of each device are associated with one another for the other items included in the processing history information.

The second conversion rule simply needs to be a conversion rule for converting the data formats of the processing history information of a plurality of different types of devices into the second common data format and is not limited to the aspect illustrated in FIG. 17. The second conversion rule is created in the information processing apparatus 100A and is stored in the storage unit 110A in advance.

Referring back to FIG. 14, the device management unit 104A manages each device connected to the network. The device management unit 104A includes a management control unit 120A, a conversion unit 122A, and an information control unit 124A.

The management control unit 120A receives, from the device management application 102A via the API, a processing request corresponding to an acquisition request in which a device ID is specified and which is received from the operation terminal 300. The management control unit 120A then transmits the processing request thus received to the information control unit 124A. This processing is the same as that performed by the management control unit 120 in the first embodiment. Similarly to the management control unit 120 in the first embodiment, if no management information MDB corresponding to the device ID included in the processing request is stored in the storage unit 110A, the management control unit 120A transmits a device search request for the device ID to a device search unit 116 of the device search management unit 106.

In the present embodiment, the management control unit 120A further receives, from the device management application 102A via the API, a processing request corresponding to a history acquisition request received from the operation terminal 300. The management control unit 120A then transmits the processing request thus received to the information control unit 124A.

The information control unit 124A reads processing history information in the data format of each device stored in the queue 114A and stores the processing history information in the storage unit 110A. If new processing history information is stored in the storage unit 110A, the information control unit 124A transmits a converted DB creation request (described later in detail) to the conversion unit 122A. Furthermore, if a history processing request is received from the management control unit 120A, the information control unit 124A issues a second conversion request to the conversion unit 122A.

The second conversion request is information for instructing to convert the processing history information in the data format of each device into processing history information in the second common data format based on the second conversion rule.

In the present embodiment, the second conversion request includes specification information for specifying processing to be acquired in the history processing request corresponding to the history acquisition request received from the operation terminal 300, identification information of an item to be acquired (item name), and an acquisition request for a record content corresponding to the item identified by the item name.

The conversion unit 122A receives the converted DB creation request and the second conversion request from the information control unit 124A.

The conversion unit 122A then performs changed DB creation and conversion.

The changed DB creation will now be described. If the converted DB creation request is received at predetermined time intervals or from the information control unit 124A, the conversion unit 122A performs the converted DB creation. The converted DB creation is processing for creating a converted DB for each device. The converted DB is a table that stores therein a record content corresponding to each item included in the processing history information in the data format of each device in a manner associated with the item name defined in the data format of the processing history information of each device.

In more detail, the conversion unit 122A reads the log definition DB corresponding to each device ID and the processing history information in the data format of each device corresponding to each device ID stored in the storage unit 11A.

The conversion unit 122A then creates the converted DB for each device ID. In more detail, the conversion unit 122A reads the item name specified in the log definition DB for each device ID. Subsequently, by associating the item name thus read with the record content corresponding to the item identified by the item name in the processing history information in the data format of each device, the conversion unit 122A creates the converted DB corresponding to each device ID.

FIGS. 18A to 18C are views for explaining examples of the converted DBs corresponding to the device IDs. FIG. 18A is a view for explaining an example of the converted DB corresponding to the device ID "MFP 1". FIG. 18B is a view for explaining an example of the converted DB corresponding to the device ID "projector 1". FIG. 18C is a view for explaining an example of the converted DB corresponding to the device ID "TV conference terminal 1".

Similarly, by associating the record content corresponding to each item indicated in the processing history information corresponding to the device ID "MFP 1" illustrated in FIG. 15A with the item name corresponding to the record content in the log definition corresponding to the device ID "MFP 1" illustrated in FIG. 16B, for example, the conversion unit 122A creates the converted DB illustrated in FIG. 18A.

By associating the record content corresponding to each item indicated in the processing history information corresponding to the device ID "projector 1" illustrated in FIG. 15B with the corresponding item name indicated in the log definition corresponding to the device ID "projector 1" illustrated in FIG. 16B, for example, the conversion unit 122A creates the converted DB illustrated in FIG. 18B.

Similarly, by associating the record content corresponding to each item indicated in the processing history information corresponding to the device ID "TV conference terminal 1" illustrated in FIG. 15C with the corresponding item name indicated in the log definition corresponding to the device ID "TV conference terminal 1" illustrated in FIG. 16C, for example, the conversion unit 122A creates the converted DB illustrated in FIG. 18C.

Referring back to FIG. 14, the conversion will now be described.

If the second conversion request is received, the conversion unit 122A performs the conversion. The conversion is processing for converting the processing history information in the data format of each device into processing history information in the second common data format common to each device based on the second conversion request and the second conversion rule.

In the present embodiment, the conversion unit 122A reads a history of processing specified by the specification information designated in the second conversion request in the processing history information in the data format of each device. The conversion unit 122A then reads a record content corresponding to the item identified by the item name specified in the second conversion request included in the history of processing of each device thus read. With this processing, the conversion unit 122A reads the record content of specific processing specified by the second conversion request from the processing history information of each device in different data formats. The conversion unit 122A then transmits the processing history information including the record content thus read to the information control unit 124A as the processing history information in the second common data format common to a plurality of devices.

In more detail, the conversion unit 122A extracts a history of processing specified by the specification information designated in the second conversion request.

An assumption is made that the specification information designated in the second conversion request is "URI:/sample/data/1", for example. In this case, the conversion unit 122A reads the common item name corresponding to the item name "URI" included in the specification information from the second conversion rule (refer to FIG. 17). If the item name included in the specification information is defined as the common item name in the second conversion rule, the conversion unit 122A reads the common item name. In the present embodiment, the conversion unit 122A reads "URI" as the common item name, for example.

The conversion unit 122A then reads the item name for each device corresponding to the common item name thus read from the second conversion rule.

Specifically, the conversion unit 122A reads "Location" for the device ID "MFP 1", "path" for the device ID "projector 1", and "URI" for the device ID "TV conference terminal 1" as the item name of each device ID corresponding to the common item name "URI".

Subsequently, the conversion unit 122A reads a converted DB including the item name of each device ID corresponding to the common item name "URI" specified by the specification information designated in the second conversion request and the record content "/sample/data/1" included in the specification information among the converted DBs corresponding to each device ID. Thus, the conversion unit 122A extracts the history of processing specified by the specification information designated in the second conversion request.

In the present embodiment, the conversion unit 122A reads a converted DB including the item name "Location" corresponding to the common item name "URI" and the record content "/sample/data/1" for the device ID "MFP 1" (refer to FIG. 18A).

The conversion unit 122A reads a converted DB including the item name "path" corresponding to the common item name "URI" and the record content "/sample/data/1" for the device ID "projector 1" (refer to FIG. 18B).

The conversion unit 122A reads a converted DB including the item name "URI" corresponding to the common item name "URI" and the record content "/sample/data/1" for the device ID "TV conference terminal 1" (refer to FIG. 18C).

Subsequently, the conversion unit 122A reads the record content corresponding to the item name of the item to be acquired that is designated in the second conversion request from the history of processing specified by the specification information designated in the second conversion request.

In more detail, the conversion unit 122A reads the common item name corresponding to the item name "totalTime" of the item to be acquired that is designated in the second conversion request from the second conversion rule (Refer to FIG. 17). If the item name designated in the second conversion request is defined as the common item name in the second conversion rule, the conversion unit 122A reads the common item name. In the present embodiment, the conversion unit 122A reads "totalTime" as the common item name corresponding to the item name "totalTime" of the item to be acquired that is designated in the second conversion request.

The conversion unit 122A then reads the item name in each device corresponding to the common item name thus read from the second conversion rule (Refer to FIG. 17).

Specifically, the conversion unit 122A reads the item name "ResponseTime" for the device ID "MFP 1", the item name "total_runtime" for the device ID "projector 1", and the item name "total" for the device ID "TV conference terminal 1" as the item name of each device ID corresponding to the common item name "totalTime".

The conversion unit 122A then reads the record content corresponding to the item name of each device thus read from the converted DB.

Specifically, the conversion unit 122A reads "3098.832", which is the record content corresponding to the item name "ResponseTime", from the converted DB corresponding to the device ID "MFP 1" illustrated in FIG. 18A. The conversion unit 122A reads "4.075", which is the record content corresponding to the item name "total_runtime", from the converted DB corresponding to the device ID "projector 1" illustrated in FIG. 18B. The conversion unit 122A reads "3.999", which is the record content corresponding to the item name "total", from the converted DB corresponding to the device ID "TV conference terminal 1" illustrated in FIG. 18C.

If the units of the record contents to be acquired are different, the conversion unit 122A makes the units consistent. Whether the units are different may be determined by reading the log definition (refer to FIGS. 16A to 16D) corresponding to each device ID and determining the units corresponding to the item names of the record contents thus acquired.

The conversion unit 122A then transmits information including the specification information designated in the second conversion request, the identification information of the item to be acquired, the record content thus read, and the device ID of the device corresponding to the record content to the information control unit 124A as the processing history information in the second common data format.

As described above, the conversion unit 122A extracts the record content corresponding to the item name of the item to be acquired that is designated in the second conversion request from the processing history information in the data format of each device based on the second conversion rule. Thus, the conversion unit 122A creates processing history information in the second common data format common to a plurality of devices and transmits the processing history information to the information control unit 124A.

After issuing the second conversion request to the conversion unit 122A, if the information control unit 124A receives processing history information in the second common data format from the conversion unit 122A, the information control unit 124A transmits the processing history information in the second common data format thus received to the management control unit 120A.

The management control unit 120A transmits the processing history information in the second common data format to the device management application 102A. The device management application 102A transmits the processing history information in the second common data format received from the device management unit 104A to the operation terminal 300 that transmits the history acquisition request corresponding thereto.

An explanation will be made of management performed in the information processing system and the information processing apparatus 100A with the configuration described above according to the present embodiment using a specific example.

Figure 19:
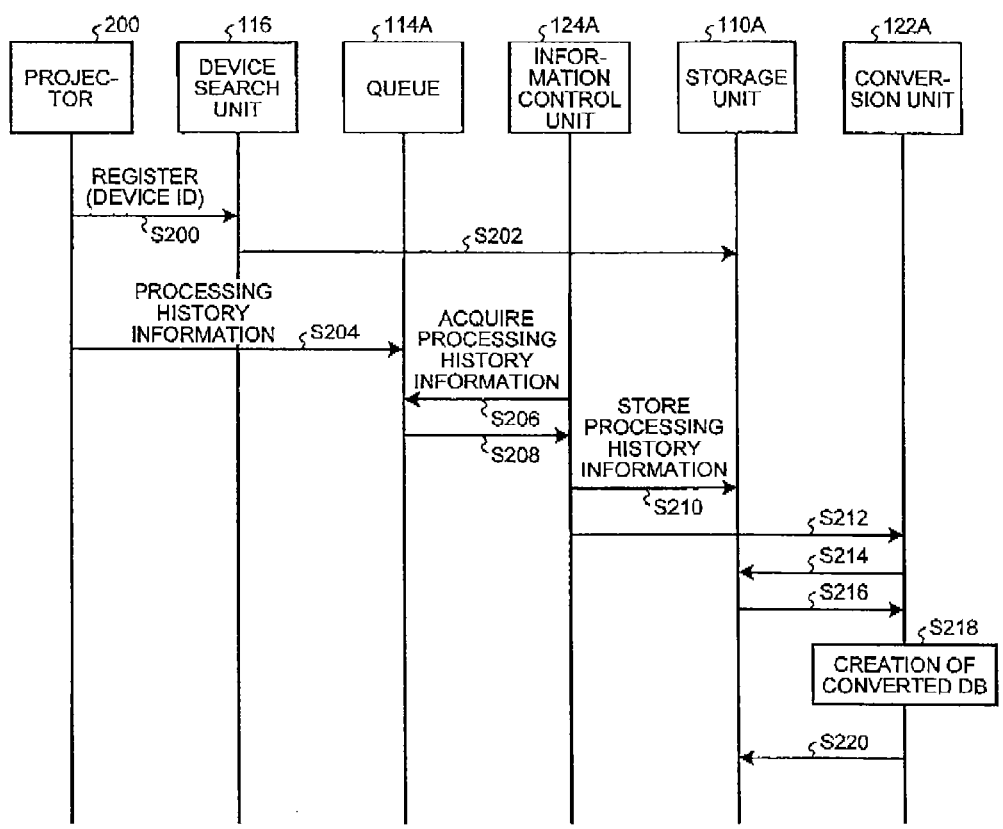
FIG. 19 is a sequence diagram of storing of a processing history.

FIG. 19 is a sequence diagram of storing of a processing history.

While the explanation will be made using the projector 200 as an example of the device connected to the network in the information processing system in FIG. 19, the same applies to the case where another device is connected.

If the user operates a power switch of the projector 200, which is not illustrated, and power is supplied to each unit of the projector 200, the projector 200 comes into a state connected to the information processing apparatus 100A via the network. The projector 200 then transmits the device ID of the projector 200 to the information processing apparatus 100A (Step S200).

If the device search unit 116 of the information processing apparatus 100A receives the device ID, the device search unit 116 stores the device ID in the storage unit 110A as an ID of a device in a state connected to the network (Step S202). This operation is the same as that in the first embodiment.

Subsequently, at predetermined time intervals or every time processing history information is updated, the projector 200 transmits the processing history information in the data format of the projector 200 to the information processing apparatus 100A (Step S204). The processing history information is registered in the queue 114A of the information processing apparatus 100A.

The information control unit 124A of the information processing apparatus 100A acquires the processing history information in the data format of each device registered in the queue 114A at predetermined time intervals (Step S206 and Step S208) and stores the processing history information in the storage unit 110A (Step S210).

If the information control unit 124A stores new processing history information in the storage unit 110A, the information control unit 124A transmits a converted DB creation request to the conversion unit 122A (Step S212).

The conversion unit 122A that receives the converted DB creation request reads the log definition DB corresponding to each device ID and the processing history information in the data format of each device corresponding to each device ID stored in the storage unit 110A (Step S214 and Step S216).

The conversion unit 122A then creates the converted DB for each device ID (Step S218). Subsequently, the conversion unit 122A stores the converted DB thus created in the storage unit 110A in a manner associated with each device ID (Step S220).

Figure 20:
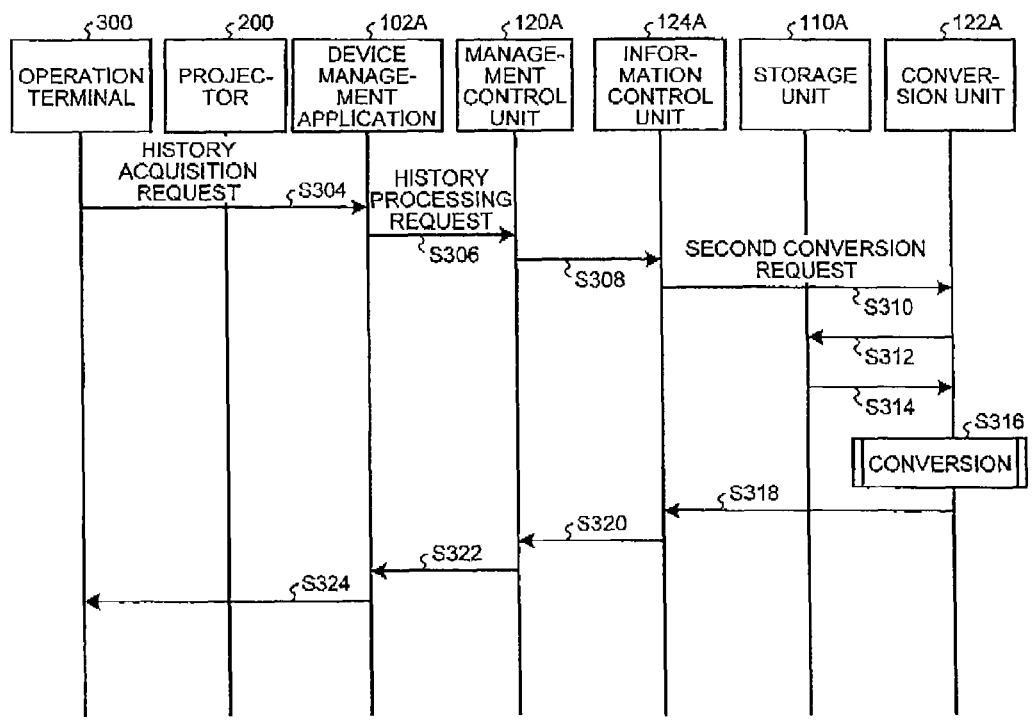
FIG. 20 is a sequence diagram of history acquisition.

History information notification processing performed by the information processing apparatus 100A will now be described specifically. FIG. 20 is a sequence diagram of history acquisition performed in the information processing system and the information processing apparatus 100A according to the present embodiment.

An assumption is made that the user issues an operation instruction to transmit a history acquisition request from the operation terminal 300 to the information processing apparatus 100A (Step S304). The device management application 102A of the information processing apparatus 100A uses the API to transmit a history processing request corresponding to the history acquisition request to the management control unit 120A (Step S306).

The management control unit 120A receives, from the device management application 102A via the API, the history processing request corresponding to the history acquisition request received from the operation terminal 300. The management control unit 120A then transmits the history processing request thus received to the information control unit 124A (Step S308).

The information control unit 124A receives the history processing request from the management control unit 120A. The information control unit 124A then transmits a second conversion request corresponding to the history processing request thus received to the conversion unit 122A (Step S310).

The conversion unit 122A that receives the second conversion request reads the second conversion rule, the converted DB corresponding to each device ID, and the log definition corresponding to each device ID stored in the storage unit 110A (Step S312 and Step S314) and performs the conversion (Step S316).

The conversion unit 122A then transmits the processing history information in the second common data format common to a plurality of devices created by the conversion to the information control unit 124A (Step S318).

If the information control unit 124A receives the processing history information in the second common data format from the conversion unit 122A, the information control unit 124A transmits the processing history information to the management control unit 120A (Step S320). The management control unit 120A transmits the processing history information in the second common data format to the device management application 102A (Step S322). The device management application 102A transmits the processing history information in the second common data format received from the device management unit 104A to the operation terminal 300 that transmits the history acquisition request corresponding thereto (Step S324).

The conversion performed at Step S316 will now be described.

Figure 21:
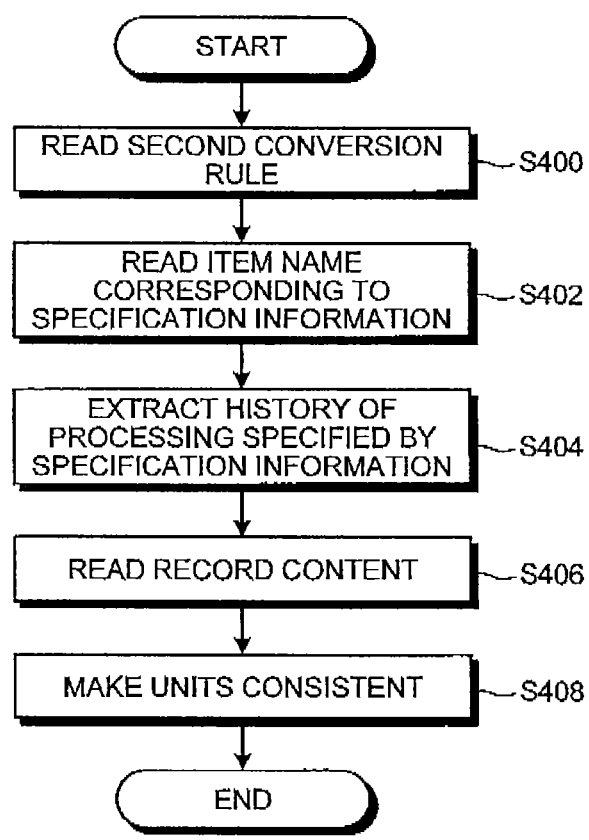
FIG. 21 is a flowchart of a process of conversion performed by a conversion unit.

FIG. 21 is a flowchart of a process of the conversion performed by the conversion unit 122A.

The conversion unit 122A reads the second conversion rule (Step S400).

Subsequently, the conversion unit 122A reads the item name in the history information in the data format of each device corresponding to the specification information designated in the second conversion request (Step S402). In more detail, the conversion unit 122A reads the common item name corresponding to the item name included in the specification information designated in the second conversion request from the second conversion rule. The conversion unit 122A then reads the item name for each device corresponding to the common item name thus read from the second conversion rule.

Subsequently, the conversion unit 122A extracts a history of processing specified by the specification information designated in the second conversion request from the processing history information in the data format of each device corresponding to each device ID (Step S404).

The conversion unit 122A then reads the record content corresponding to the item name of the item to be acquired that is designated in the second conversion request from the history of processing specified by the specification information designated in the second conversion request (Step S406).

If the units of the record contents read at Step S406 are different, the conversion unit 122A makes the units consistent (Step S408).

Thus, the present routine is terminated.

By performing the process from Step S400 to Step S408, the conversion unit 122A extracts the record content corresponding to the item name of the item to be acquired that is designated in the second conversion request from the processing history information in the data format of each device based on the second conversion rule. Thus, the conversion unit 122A creates the processing history information in the second common data format common to a plurality of devices.

As described above, in the information processing apparatus 100A according to the present embodiment, the conversion unit 122A extracts the record content corresponding to the item name of the item to be acquired that is designated in the second conversion request from the processing history information in the data format of each device based on the second conversion rule. Thus, the conversion unit 122A creates the processing history information in the second common data format common to a plurality of devices. The second conversion rule is a conversion rule for converting the data formats of the processing history information of a plurality of different types of devices into the second common data format serving as the data format common to these devices.

Therefore, in addition to the advantageous effects in the first embodiment, the information processing apparatus 100A according to the third embodiment can process the processing history information in the data format of each device while absorbing the difference among the data formats.

The second conversion rule is a table that stores therein a common item name, a device ID, and a corresponding item name in the processing history information in the data format of each device in a manner associated with one another. Therefore, the information processing apparatus 100A can manage the item name of the item included in the processing history information in the data format of each device in a manner associated with the common item name having the same meaning based on the second conversion rule. As a result, the information processing apparatus 100A can collectively manage a plurality of types of processing history information in different data formats.

The information processing apparatuses according to the first to the third embodiments have a hardware configuration including a control device such as a central processing unit (CPU), a storage device such as a read-only memory (ROM) and a random access memory (RAM), an external storage device such as an HDD and a compact disk (CD) drive, a display device such as a display, and an input device such as a keyboard and a mouse.

The computer program executed in the information processing apparatuses and the information processing systems according to the first to the third embodiments is provided in a manner recorded in a computer-readable recording medium, such as a compact disk read-only memory (CD-ROM), a flexible disk (FD), a compact disk recordable (CD-R), and a digital versatile disk (DVD), as a file in an installable or executable format.

The computer program executed in the information processing apparatuses and the information processing systems according to the first to the third embodiments may be provided in a manner stored in a computer connected to a network such as the Internet to be made available for downloads via the network. Furthermore, the computer program executed in the information processing apparatuses and the information processing systems according to the first to the third embodiments may be provided or distributed over a network such as the Internet.

The computer program executed in the information processing apparatuses and the information processing systems according to the first to the third embodiments may be provided in a manner incorporated in a ROM and the like in advance.

The computer program executed in the information processing apparatuses and the information processing systems according to the first to the third embodiments have a module configuration including each unit described above. In actual hardware, the CPU (processor) reads and executes each computer program from the storage medium described above to load each unit on the main memory. Thus, each unit is generated on the main memory.

Even if a new type of device is added as a device to be managed, the information processing apparatus according to the present invention can readily support the device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus connectable to a plurality of devices of different types via a network, the information processing apparatus comprising:
a memory; and
a processor configured to:
receive, from each of the plurality of devices, master data of management information when the each of the plurality of devices is connected to the information processing apparatus for a first time;
store, in the memory, the master data of the management information of the each of the plurality of devices, the master data including at least item identification information of each management item included in the management information and data format of the each management item corresponding to the each of the plurality of devices;
store, in the memory, a first conversion rule for converting the management information into management information in a first common data format common to the plurality of devices;
receive, from the each of the plurality of devices, the management information of the each of the plurality of devices in a data format corresponding to the each of the plurality of devices; and
convert the management information thus received into the management information in the first common data format based on the master data of the management information and the first conversion rule.

2. The information processing apparatus according to claim 1, wherein the processor is configured to:
store, in the memory, identification information of the each of the plurality of devices and the management item in a manner associated with each other;
receive, from the each of the plurality of devices, the management information including the identification information of the each of the plurality of devices and an actual value corresponding to the management item in the data format corresponding to the each of the plurality of devices; and
convert the management information including the actual value thus received into the management information in the first common data format based on the identification information of the each of the plurality of devices, the management item, and the first conversion rule.

3. The information processing apparatus according to claim 2, wherein the processor is configured to:
receive, from an operation terminal connected to the network, an acquisition request for the management information including the identification information of any of the plurality of devices; and transmit, to the operation terminal, the management information in the first common data format corresponding to a corresponding device identified by the identification information thus received.

4. The information processing apparatus according to claim 1, wherein the processor is configured to:
   store, in the memory, for the each of the plurality of devices to be connected to the network, the identification information of the each of the plurality of devices, a command to cause the each of the plurality of devices to perform corresponding processing, and a parameter required for executing the command in a manner associated with one another;
   receive, from an operation terminal connected to the network, the identification information of any of the plurality of devices and a performance request to cause a corresponding device identified by the identification information to perform specific processing;
   create, based on the performance request, processing performance information including the command corresponding to the identification information and the specific processing specified in the performance request and the parameter required for executing the command; and
   store the processing performance information thus created in another memory in a manner associated with the identification information.

5. The information processing apparatus according to claim 3, further comprising:
   an application programming interface that is capable of receiving a processing request and is defined by a predetermined function, wherein
   the processor is configured to issue the processing request via the application programming interface.

6. The information processing apparatus according to claim 4, further comprising:
   an application programming interface that is capable of receiving a processing request and is defined by a predetermined function, wherein
   the processor is configured to issue the processing request via the application programming interface.

7. The information processing apparatus according to claim 1, wherein the processor is configured to:
   receive, from the each of the plurality of devices, processing history information of the each of the plurality of devices in the data format corresponding to the each of the plurality of devices;
   store, in the memory, a second conversion rule for converting the processing history information into processing history information in a second common data format common to the devices, and
   convert the processing history information thus received into the processing history information in the second common data format based on the second conversion rule.

8. An information processing method performed in an information processing apparatus connectable to a plurality of devices of different types via a network, the information processing method comprising:
   receiving, from each of the plurality of devices, master data of management information when the each of the plurality of devices is connected to the information processing apparatus for a first time;
   storing, in a memory, the master data of the management information of the each of the plurality of devices, the master data including at least item identification information of each management item included in the management information and data format of the each management item corresponding to the each of the plurality of devices;
   receiving, from the each of the plurality of devices, the management information of the each of the plurality of devices in a data format corresponding to the each of the plurality of devices; and
   converting, based on the master data of the management information and a first conversion rule for converting the management information into management information in a first common data format common to the plurality of devices, the management information thus received into the management information in the first common data format.

9. A computer program product comprising a non-transitory computer-readable medium including a computer-readable program, the program causing a computer, which is connectable to a plurality of devices of different types via a network, to execute:
   receiving, from each of the plurality of devices, master data of management information when the each of the plurality of devices is connected to the computer for a first time;
   storing, in a memory, the master data of the management information of the each of the plurality of devices, the master data including at least item identification information of each management item included in the management information and data format of the each management item corresponding to the each of the plurality of devices;
   receiving, from the each of the plurality of devices, the management information of the each of the plurality of devices in a data format corresponding to the each of the plurality of devices; and
   converting, based on the master data of the management information and a first conversion rule for converting the management information into management information in a first common data format common to the plurality of devices, the management information thus received into the management information in the first common data format.

10. The information processing apparatus according to claim 1, wherein the processor is configured to convert the item identification information into item identification information in the first common data format based on the master data of the management information and the first conversion rule.

* * * * *